US011073376B2

(12) United States Patent
Fuyuno

(10) Patent No.: US 11,073,376 B2
(45) Date of Patent: Jul. 27, 2021

(54) OPTICAL DISPLACEMENT METER

(71) Applicant: Keyence Corporation, Osaka (JP)

(72) Inventor: Akira Fuyuno, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 16/823,366

(22) Filed: Mar. 19, 2020

(65) Prior Publication Data

US 2021/0140757 A1 May 13, 2021

(30) Foreign Application Priority Data

Nov. 8, 2019 (JP) .............................. JP2019-203520

(51) Int. Cl.
*G01B 11/06* (2006.01)
*G01B 11/04* (2006.01)
*G01B 11/25* (2006.01)

(52) U.S. Cl.
CPC .......... *G01B 11/0608* (2013.01); *G01B 11/04* (2013.01); *G01B 11/0691* (2013.01); *G01B 11/25* (2013.01)

(58) Field of Classification Search
CPC ............................ G01B 11/0608; G01B 11/25
See application file for complete search history.

(56) References Cited

U.S. PATENT DOCUMENTS

| | | | | |
|---|---|---|---|---|
| 6,678,055 B2 * | 1/2004 | Du-Nour | ................ | G01B 11/16 356/35.5 |
| 8,675,209 B2 * | 3/2014 | Usami | ..................... | G01S 17/48 356/614 |
| 2003/0067613 A1 * | 4/2003 | Ishikawa | ................. | G06T 7/521 356/614 |
| 2006/0055943 A1 * | 3/2006 | Kawasaki | ........... | G01B 11/002 356/606 |
| 2020/0049487 A1 | 2/2020 | Tsuchida | | |
| 2020/0049490 A1 | 2/2020 | Tsuchida | | |
| 2020/0404243 A1 * | 12/2020 | Saphier | ................... | G06T 7/521 |

FOREIGN PATENT DOCUMENTS

WO            01/73375 A1    10/2001

OTHER PUBLICATIONS

U.S. Appl. No. 16/823,363, filed Mar. 19, 2020 (40 pages).
U.S. Appl. No. 16/823,364, filed Mar. 19, 2020 (41 pages).
U.S. Appl. No. 16/823,365, filed Mar. 19, 2020 (52 pages).

* cited by examiner

*Primary Examiner* — Michael A Lyons
(74) *Attorney, Agent, or Firm* — Kilyk & Bowersox, PLLC

(57) ABSTRACT

An imaging head 100 includes a laser projector 110, an LED projector 120, a light receiving lens 132, a light receiver 131, and a processor 200. The laser projector 110 emits measurement light to a workpiece W. The LED projector 120 emits uniform observation light to the workpiece W. The light receiving lens 132 converges reflected light of the measurement light and reflected light of the observation light that are reflected back from the workpiece W. The light receiver 131 has a light receiving surface composed of multiple light receiving elements that are two-dimensionally arranged. The laser projector 110, the light receiver 131, and the light receiving lens 132 are arranged so that a plane containing the light receiving surface and a plane containing the principal plane of the light receiving lens 132 will satisfy the Scheimpflug condition relative to a light projection axis of the laser projector 110.

10 Claims, 17 Drawing Sheets

OPTICAL DISPLACEMENT METER

CROSS-REFERENCE TO RELATED APPLICATIONS

The present application claims foreign priority based on Japanese Patent Application No. 2019-203520, filed Nov. 8, 2019, the contents of which are incorporated herein by reference.

BACKGROUND OF THE INVENTION

1. Field of the Invention

The present invention relates to an optical displacement meter using an optical cutting method for measuring a profile of a measurement object.

2. Description of Related Art

An optical displacement meter using an optical cutting method may be used to measure a profile of a measurement object (hereinafter called a "workpiece"). For example, WO 2001/073375 describes an optical displacement meter including a laser diode and a two-dimensional charge coupled device (CCD). The laser diode emits linear-shaped measurement light to a workpiece, and reflected light of the measurement light that is reflected back from the workpiece is received by the CCD. The CCD generates a video signal, and a displacement in the height direction of a desired position on the workpiece is measured on the basis of this video signal.

In order to accurately measure a desired position on the workpiece, a user needs to make an irradiation position of the measurement light exactly coincide with a measurement position of the workpiece by adjusting the relative position between the optical displacement meter and the workpiece. However, in a case in which the optical displacement meter and the workpiece are close to each other, it is difficult to visually observe the irradiation position of the measurement light.

In the optical displacement meter described in WO 2001/073375, the CCD is physically or optically directly faced to the workpiece in order to obtain a straight-view image of the workpiece.

This configuration provides an entirely clear image of the workpiece and enables easy position adjustment of the optical displacement meter. However, in a case in which a workpiece has a part with a height greatly different from the height of other part at a measurement position, it is difficult to obtain an oblique-view image in which the CCD is focused on every part at the measurement position. In this situation, measurement accuracy of the displacement differs in accordance with the height at the measurement position, whereby the profile of the workpiece is hard to measure with high accuracy.

SUMMARY OF THE INVENTION

An object of the present invention is to provide an optical displacement meter that is easy to adjust the position relative to a workpiece without reducing measurement accuracy of a profile.

The present invention provides an optical displacement meter using an optical cutting method for measuring a profile of a measurement object. The optical displacement meter includes a laser projector, an LED projector, a light receiving lens, a light receiver, and a processor. The laser projector has a first light projection axis and is configured to emit strip-shaped laser light extending in one direction or emit spot-shaped laser light for scanning in the one direction, to the measurement object, as measurement light. The LED projector is configured to emit uniform light to the measurement object, as observation light. The light receiving lens is configured to converge reflected light of the measurement light and reflected light of the observation light that are reflected back from the measurement object. The light receiver has a light receiving surface and is configured to receive light that is converged by the light receiving lens and to output a received-light amount distribution. The light receiving surface is composed of multiple light receiving elements that are two-dimensionally arranged. The processor is configured to execute a process of generating profile data on the basis of the received-light amount distribution of the measurement light output by the light receiver and to execute a process of generating observation image data on the basis of the received-light amount distribution of the observation light output by the light receiver, during measurement. The profile data shows a profile of the measurement object. The observation image data shows an image of the measurement object that is irradiated by the observation light, as an observation image. The laser projector, the light receiver, and the light receiving lens are arranged so that a plane containing the light receiving surface and a plane containing the principal plane of the light receiving lens satisfy the Scheimpflug condition relative to the first light projection axis, whereby observation image data showing an observation image in which a focal point of the light receiver relatively coincides with a region in the vicinity of a measurement position that is irradiated by the measurement light during the measurement, is generated.

In this optical displacement meter, the strip-shaped laser light extending in one direction or the spot-shaped laser light for scanning in one direction is emitted to the measurement object, as measurement light, by the laser projector. The measurement light that is reflected back from the measurement object is converged by the light receiving lens. The light receiver receives the measurement light, which is converged by the light receiving lens, at the light receiving surface composed of the two-dimensionally arranged multiple light receiving elements, and the light receiver outputs a received-light amount distribution. Profile data that shows a profile of the measurement object is generated on the basis of the received-light amount distribution of the measurement light, which is output by the light receiver during measurement.

Moreover, uniform light is emitted to the measurement object, as the observation light, by the LED projector. The observation light that is reflected back from the measurement object is converged by the light receiving lens. The light receiver receives the observation light, which is converged by the light receiving lens, at the light receiving surface, and the light receiver outputs a received-light amount distribution. Observation image data is generated on the basis of the received-light amount distribution of the observation light, which is output by the light receiver. The observation image data shows an image of the measurement object that is irradiated by the observation light, as an observation image.

In these conditions, the laser projector, the light receiver, and the light receiving lens are arranged so that the plane containing the light receiving surface of the light receiver and the plane containing the principal plane of the light receiving lens will satisfy the Scheimpflug condition relative to the first light projection axis of the laser projector. This makes the focal point of the light receiver relatively coincide with a region in the vicinity of the measurement position irradiated by the measurement light during measurement, even when the measurement object has a part with a height greatly different from the height of other part. Thus, the profile data is generated with high accuracy.

Moreover, the observation image data that shows an observation image in which the focal point of the light receiver relatively coincides with the region in the vicinity of the measurement position that is irradiated by the measurement light during the measurement, is generated. Thus, the observation image clearly shows the measurement position that is measured by the measurement light, on the measurement object. This facilitates a user to adjust the position of the optical displacement meter relative to the measurement object by adjusting the position of the optical displacement meter or the measurement object so that a desired part on the measurement object will clearly appear in the observation image. As a result, the position adjustment of the optical displacement meter relative to the measurement object is easily performed without reducing measurement accuracy of the profile.

The processor may be configured to control the laser projector and the LED projector so that the measurement light and the observation light are emitted simultaneously. The processor may also be configured to generate observation image data that shows an observation image showing a bright line of the measurement light in a manner superimposed on the measurement position irradiated by the measurement light on the measurement object.

In this case, the measurement position that is irradiated by the measurement light on the measurement object, appear clearly in the form of a bright line in the observation image. This enables a user to more easily and more precisely adjust the position of the optical displacement meter relative to the measurement object by adjusting the position of the optical displacement meter or the measurement object so that a bright line will overlap a desired part on the measurement object in the observation image.

The processor may be configured to control the laser projector and the LED projector so that the measurement light and the observation light are emitted alternately. The processor may also be configured to alternately execute a process of generating measurement image data on the basis of the received-light amount distribution of the measurement light output by the light receiver and the process of generating the observation image data. The measurement image data shows an image of the measurement object that is irradiated by the measurement light, as a measurement image.

In this case, a bright line of the measurement light appears in the measurement image. This enables a user to adjust the position of the optical displacement meter or the measurement object, while viewing the bright line of the measurement light in the measurement image as well as the measurement object in the observation image. Thus, the position of the optical displacement meter relative to the measurement object is precisely adjusted.

The processor may be configured to display the image by automatically switching between the measurement image and the observation image. This enables a user to adjust the position of the optical displacement meter or the measurement object so that a bright line in the measurement image will overlap a desired part on the measurement object in the observation image, while viewing the measurement image and the observation image that are automatically switched and are displayed. Thus, the position of the optical displacement meter relative to the measurement object is more easily and more precisely adjusted.

The processor may be configured to composite the measurement image data with the observation image data and to display an observation image that shows the bright line of the measurement light in the manner superimposed on the measurement position irradiated by the measurement light on the measurement object. This enables a user to adjust the position of the optical displacement meter or the measurement object so that a bright line in the observation image will overlap a desired part on the measurement object. Thus, the position of the optical displacement meter relative to the measurement object is more easily and more precisely adjusted.

The processor may be configured to control the laser projector and the LED projector so that the measurement light and the observation light are emitted alternately during an exposure period of the light receiver. The processor may also be configured to generate observation image data that shows an observation image showing the bright line of the measurement light in the manner superimposed on the measurement position irradiated by the measurement light on the measurement object.

In this case, the measurement position irradiated by the measurement light on the measurement object, appears clearly in the form of a bright line in the observation image. This enables a user to more easily and more precisely adjust the position of the optical displacement meter relative to the measurement object by adjusting the position of the optical displacement meter or the measurement object so that a bright line will overlap a desired part on the measurement object in the observation image.

The optical displacement meter may further include an exclusive control circuit that is configured to inhibit the measurement light and the observation light from being emitted simultaneously.

In some cases, it may be desired to limit the intensity of light that is emitted from the optical displacement meter, so as not to exceed a predetermined upper limit. The above described configuration inhibits the measurement light and the observation light from being emitted simultaneously, by using the exclusive control circuit. Thus, in the case in which an upper limit is set to the intensity of the measurement light, the intensity of the light emitted from the optical displacement meter does not exceed the upper limit. Thus, the intensity of the measurement light can be maintained at the upper limit. This prevents decrease in the processing efficiency due to insufficient intensity of the measurement light.

The LED projector may have a second light projection axis parallel to the first light projection axis of the laser projector, in a housing having an internal space for containing the laser projector, the LED projector, the light receiving lens, and the light receiver. The housing may include a first surface, a second surface, a measurement window, an observation window, and a light reception window. The first surface may be perpendicular to the first light projection axis and the second light projection axis. The second surface may be provided in a recess that is recessed toward the internal space from the first surface so as to be inclined relative to the first surface. The measurement window may be provided to the first surface and be configured to transmit the measurement light emitted from the laser projector to the measurement object. The observation window may be provided to the first surface and be configured to transmit the observation light emitted from the LED projector to the measurement object. The light reception window may be provided to the second surface and be configured to transmit reflected light of the measurement light and reflected light of the observation light that are reflected back from the measurement object. This allows the laser projector, the LED projector, and the imaging unit to be contained in a compact space while satisfying the Scheimpflug condition.

The observation window may be provided at a position closer to the light reception window than the measurement window. This prevents the housing from having a large dimension in a direction in which the observation window, the measurement window, and the light reception window are arranged.

The optical displacement meter may further include a band-pass filter that is provided on an optical path of light that is reflected back from the measurement object. The laser projector may be configured to emit measurement light having a wavelength of 400 nm or greater and 480 nm or less. The LED projector may be configured to emit observation light having a wavelength in a range including the wavelength of the measurement light. A transmittance of the band-pass filter in the wavelength range of the measurement light may be higher than a transmittance of the band-pass filter outside the wavelength range of the measurement light.

In this case, the band-pass filter transmits the measurement light and a component of the observation light having a wavelength approximately equal to that of the measurement light but shields a component of the measurement light having other wavelength and ambient light. Thus, the profile data and the observation image data are accurately generated. Moreover, the measurement light having the wavelength of 400 nm or greater allows a user to easily visually recognize the measurement light. This enhances usability of the optical displacement meter. Furthermore, the measurement light having the wavelength of 480 nm or less enables generating the profile data with high accuracy.

The processor may be configured to generate composite image data that shows a first composite image showing the bright line of the measurement light in a manner superimposed on a profile, by compositing the measurement image data and the profile data. The processor may also be configured to display the image by switching between the first composite image and the observation image in response to instruction from a user. In this case, a user easily recognizes whether the measurement light irradiates a desired part on the measurement object, by viewing the profile in the first composite image as well as viewing the measurement position measured by the measurement light on the measurement object, in the observation image.

The processor may be configured to display a second composite image that contains the profile superimposed on the observation image, by compositing the profile data and the observation image data. In this case, a user easily recognizes whether the measurement light irradiates a desired part on the measurement object, by viewing the observation image and the profile in the second composite image.

The present invention facilitates the position adjustment of the optical displacement meter relative to the measurement object without reducing measurement accuracy of the profile.

DESCRIPTION OF EMBODIMENTS

<1> First Embodiment (1) Configuration of Optical Displacement Meter

Figure 1:
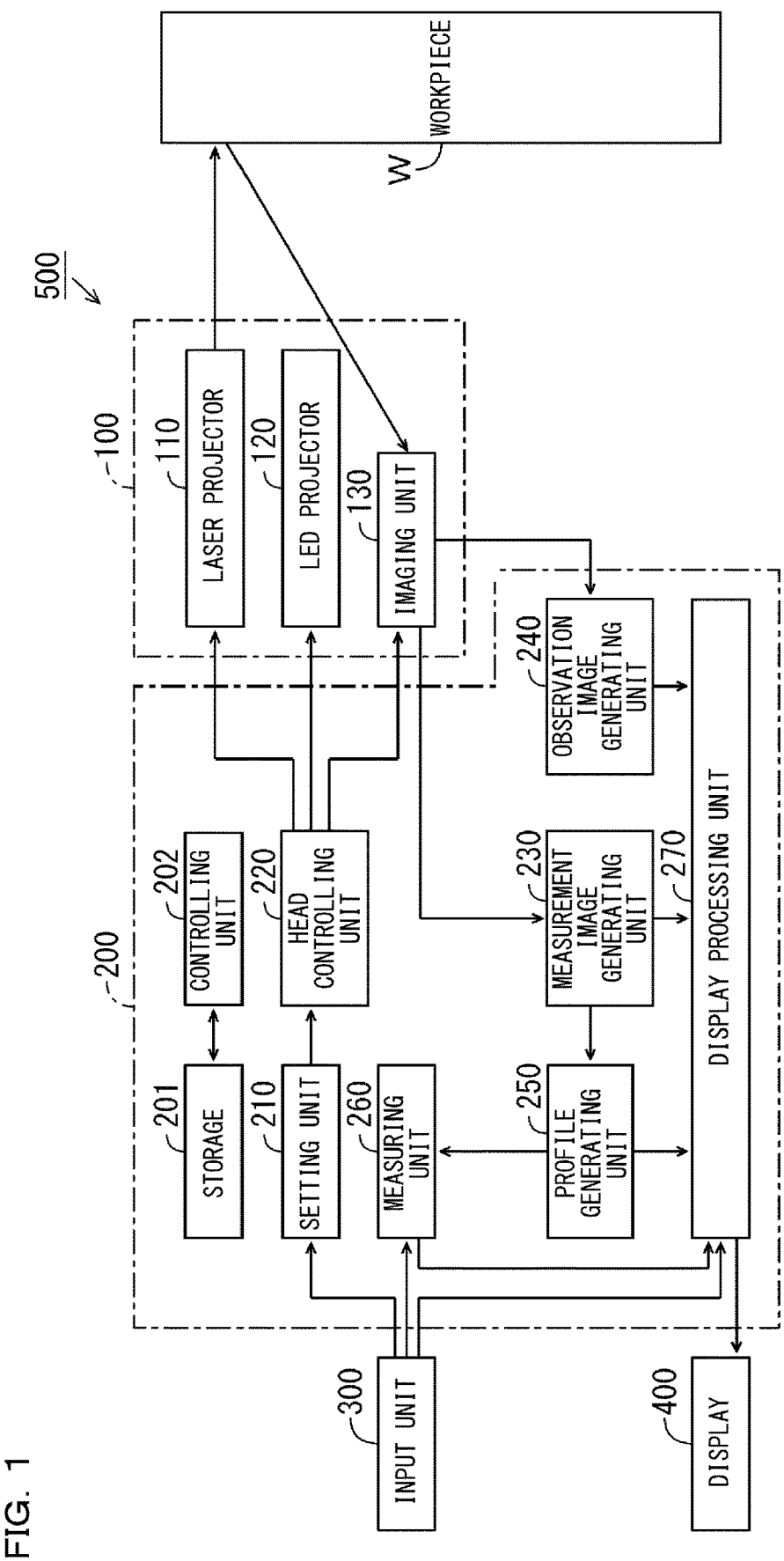
FIG. 1 is a block diagram showing a configuration of an optical displacement meter according to a first embodiment.

Hereinafter, an optical displacement meter using an optical cutting method will be described with reference to drawings, as an optical displacement meter according to an embodiment of the present invention. FIG. 1 is a block diagram showing a configuration of an optical displacement meter according to a first embodiment. As shown in FIG. 1, an optical displacement meter 500 includes an imaging head 100, a processor 200, an input unit 300, and a display 400. The imaging head 100 is detachable from the processor 200. The imaging head 100 and the processor 200 may be integrated into one body.

The imaging head 100 includes a laser projector 110, an LED projector 120, and an imaging unit 130. The laser projector 110 is configured to emit strip-shaped measurement light extending in one direction, to a measurement object (hereinafter called a "workpiece W"). Instead of the strip-shaped measurement light extending in one direction, the laser projector 110 may be configured to emit spot-shaped light for scanning in one direction, to a workpiece W, as the measurement light. The LED projector 120 is configured to emit uniform observation light to a workpiece W. The imaging unit 130 receives the measurement light or the observation light that is reflected back from the workpiece W and then outputs a received-light amount distribution.

The processor 200 includes a storage 201 and a controlling unit 202. The storage 201 is composed of a device such as a random access memory (RAM), a read only memory (ROM), a hard disk, or a semiconductor memory, and the storage 201 stores a measurement program. The controlling unit 202 is, for example, a central processing unit (CPU).

The processor 200 also includes a setting unit 210, a head controlling unit 220, a measurement image generating unit 230, an observation image generating unit 240, a profile generating unit 250, a measuring unit 260, and a display processing unit 270, as functional parts. The controlling unit 202 executes the measurement program stored in the storage 201, whereby the functional parts of the processor 200 are implemented. A part or all of the functional parts of the processor 200 may be implemented by hardware such as an electronic circuit.

The display processing unit 270 of the processor 200 switches displays of an observation image, a measurement image, and a composite image, each which will be described later. The setting unit 210 sets either one of the observation image, the measurement image, and the composite image as an image to be displayed on the display 400, on the basis of specification provided by the input unit 300.

The setting unit 210 also sets imaging conditions such as brightness or intensity of the measurement light, brightness or intensity of the observation light, and an exposure period of the imaging unit 130, on the basis of specification provided by the input unit 300. A user is allowed to specify the imaging conditions to the setting unit 210 by operating the input unit 300. The head controlling unit 220 controls operations of the laser projector 110, the LED projector 120, and the imaging unit 130 on the basis of the imaging conditions set to the setting unit 210.

The measurement image generating unit 230 generates measurement image data on the basis of a received-light amount distribution of the measurement light, which is output by the imaging unit 130. The measurement image data shows an image of a workpiece W that is irradiated by the measurement light (hereinafter called a "measurement image"). The observation image generating unit 240 generates observation image data on the basis of a received-light amount distribution of light containing the observation light, which is output by the imaging unit 130. The observation image data shows an image of a workpiece W that is irradiated by the light containing the observation light (hereinafter called an "observation image").

The "observation image" of the present invention represents an image shown by image data that is generated by imaging a workpiece W by the imaging unit 130 while the LED projector 120 emits the observation light to the workpiece W irrespective of the lighting state of the laser projector 110. The "measurement image" of the present invention represents an image shown by image data that is generated by imaging a workpiece W by the imaging unit 130 while the laser projector 110 emits the measurement light but the LED projector 120 does not emit the observation light to the workpiece W. The "composite image" of the present invention represents an image shown by image data that is generated so as to show a profile in a manner superimposed on a measurement image or an observation image.

The profile generating unit 250 generates profile data that shows a profile of a workpiece W, on the basis of the measurement image data, which is generated by the measurement image generating unit 230. The measuring unit 260 performs a measurement process on the basis of the profile data, which is generated by the profile generating unit 250. The measurement process is performed to calculate a dimension or a displacement at a specified part on a surface of a workpiece W on the basis of the profile data. A user is allowed to specify a desired part of a workpiece W to be subjected to the measurement process, in the profile data by operating the input unit 300.

The display processing unit 270 displays various images on the display 400. The various images include a measurement image, an observation image, a profile, and an image showing a result of measurement performed by the measuring unit 260. A user is allowed to specify an image to be displayed to the display processing unit 270 and to instruct the display processing unit 270 to switch displayed images, by operating the input unit 300. Details of the display processing unit 270 will be described later.

The input unit 300 includes a keyboard and a pointing device and is able to be operated by a user. A mouse, a joystick, or other device is used as the pointing device. Alternatively, a dedicated console may be used as the input unit 300. The display 400 is composed of, for example, a liquid crystal display panel or an organic electroluminescence (EL) panel.

(2) Imaging Head

Figure 2:
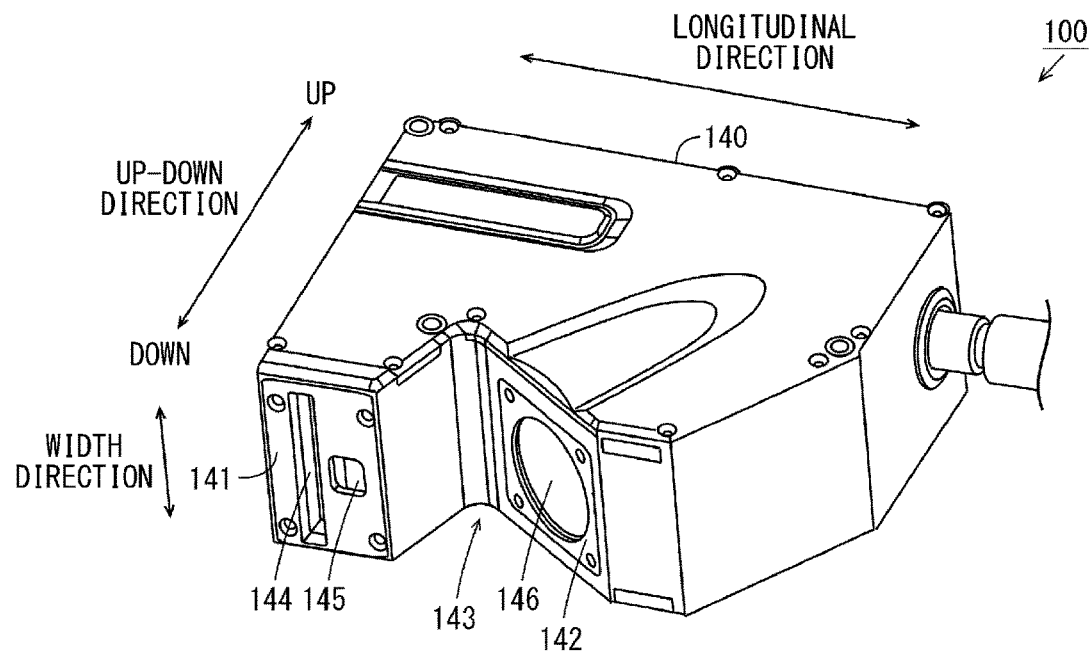
FIG. 2 is a perspective view showing an external appearance of an imaging head in FIG. 1.
Figure 3:
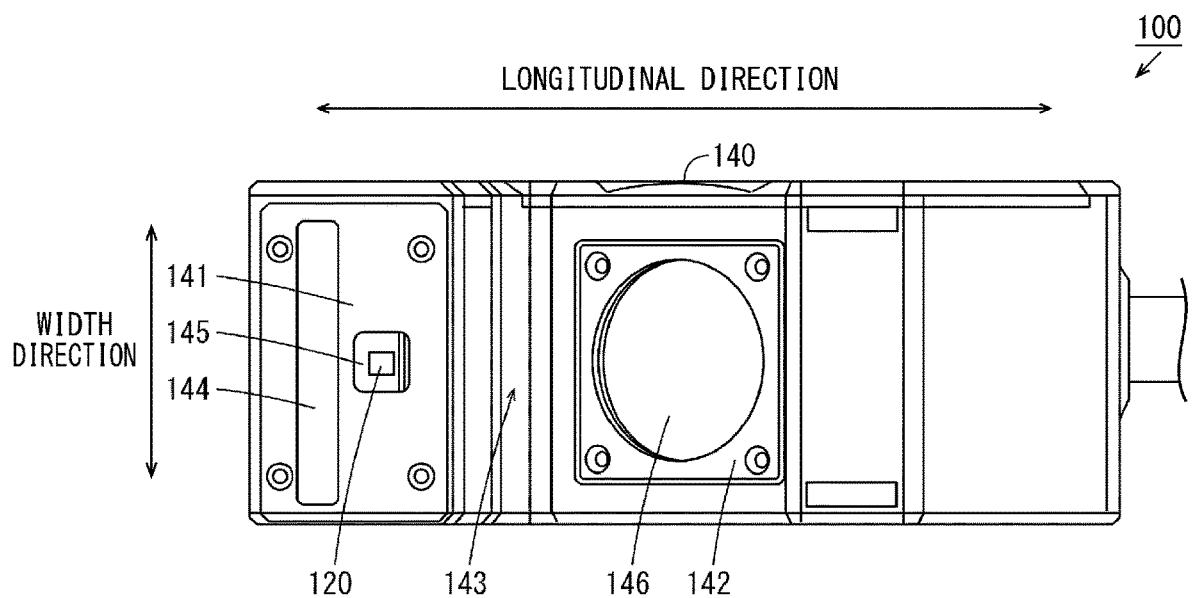
FIG. 3 is a bottom surface view showing the imaging head in FIG. 1.

FIG. 2 is a perspective view showing an external appearance of the imaging head 100 in FIG. 1. FIG. 3 is a bottom surface view showing the imaging head 100 in FIG. 1. As shown in FIGS. 2 and 3, a housing 140 of the imaging head 100 has an external appearance and an internal space that are approximately rectangular parallelepiped shape. The laser projector 110, the LED projector 120, and the imaging unit 130 are contained in the internal space of the housing 140. A width direction, a longitudinal direction, and an up-down direction orthogonal to each other are defined to the housing 140.

A lower surface 141 and an inclined surface 142 are provided to a lower part of the housing 140. In addition, a recess 143 that is upwardly recessed is formed at the approximately center part in the longitudinal direction of the lower part of the housing 140. The lower surface 141 is approximately orthogonal to the up-down direction and faces downward. The inclined surface 142 is positioned in the recess 143 and faces obliquely downward. The lower surface 141 is formed with a measurement window 144 and an observation window 145. The inclined surface 142 is formed with a light reception window 146.

The measurement window 144 has an approximately rectangular shape extending in the width direction and is disposed to enable downward transmission of the strip-shaped measurement light from the laser projector 110 in FIG. 1, which is contained in the housing 140. The observation window 145 has an approximately square shape and is disposed at the approximately center part in the width direction to enable downward transmission of the observation light from the LED projector 120 in FIG. 1, which is contained in the housing 140. The light reception window 146 has a circular shape and is disposed at the approximately center part in the width direction to enable light from an obliquely downward direction to pass therethrough to the imaging unit 130 in FIG. 1, which is contained in the housing 140.

In this embodiment, the observation window 145 is positioned between the measurement window 144 and the recess 143. That is, the observation window 145 is positioned closer to the light reception window 146 than the measurement window 144 in the longitudinal direction. This arrangement prevents the housing 140 from having a large dimension in the longitudinal direction.

Figure 4:
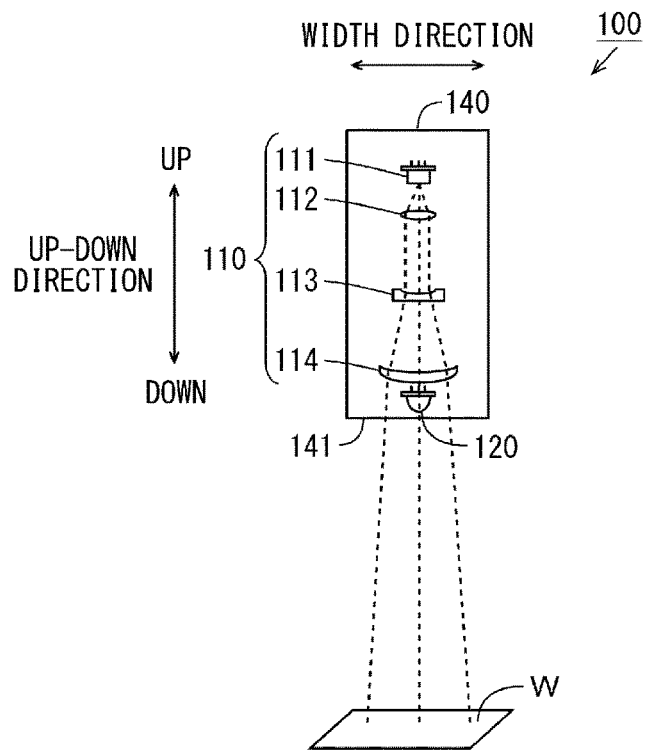
FIG. 4 is a diagram for explaining arrangement of a laser projector, an LED projector, and an imaging unit in FIG. 1.
Figure 5:
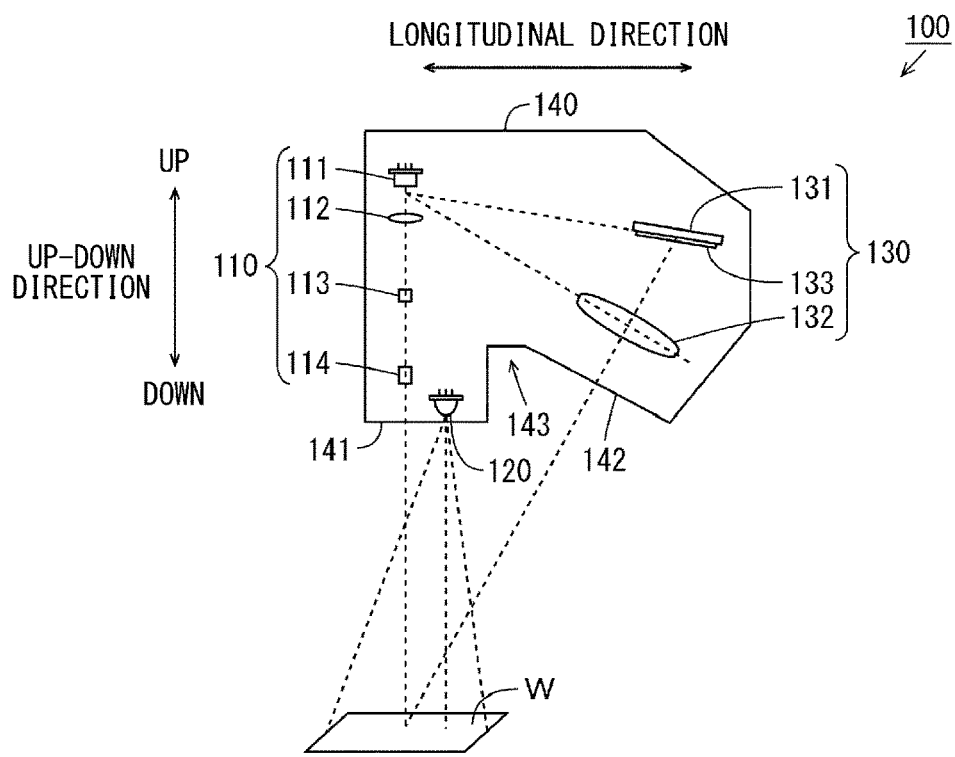
FIG. 5 is a diagram for explaining the arrangement of the laser projector, the LED projector, and the imaging unit in FIG. 1.

FIGS. 4 and 5 are diagrams for explaining the arrangement of the laser projector 110, the LED projector 120, and the imaging unit 130 in FIG. 1. FIG. 4 shows the imaging head 100 as viewed from the longitudinal direction. FIG. 5 shows the imaging head 100 as viewed from the width direction. As shown in FIG. 4, the laser projector 110 includes a laser diode (LD) 111, a collimator lens 112, and light projection lenses 113 and 114.

The LD111, the collimator lens 112, and the light projection lenses 113 and 114 are arranged in this order from the upper side to the lower side in the housing 140. The measurement window 144 in FIG. 2 is arranged under the light projection lens 114. The LD111, the collimator lens 112, and the light projection lenses 113 and 114 provide a light projection axis of the laser projector 110. The light projection axis of the laser projector 110 is approximately parallel to the up-down direction and is approximately orthogonal to the lower surface 141 of the housing 140.

The LD111 downwardly emits laser light having a wavelength of, for example, 400 nm or greater and 480 nm or less, as the measurement light. The collimator lens 112 transmits the measurement light, which is emitted by the LD111, while collimating it. The light projection lenses 113 and 114 transmit the measurement light that is collimated by the collimator lens 112, while expanding it into a strip shape in the width direction. The measurement light that is expanded into the strip shape by the light projection lenses 113 and 114 passes through the measurement window 144 and irradiates the workpiece W.

The LED projector 120 is implemented by an LED and is disposed in the housing 140 so as to be close to the observation window 145 in FIG. 2. The light projection axis of the LED projector 120 is approximately parallel to the up-down direction and is approximately orthogonal to the lower surface 141 of the housing 140. That is, the light projection axis of the LED projector 120 is approximately parallel to the light projection axis of the laser projector 110. The LED projector 120 downwardly emits light having a wavelength of 400 nm or greater and 480 nm or less as the observation light. The observation light, which is emitted by the LED projector 120, passes through the observation window 145 and irradiates the workpiece W.

As shown in FIG. 5, the imaging unit 130 includes a light receiver 131, a light receiving lens 132, and an optical filter 133. The light receiver 131 is, for example, a complementary metal oxide semiconductor (CMOS) sensor, and the light receiver 131 has a light receiving surface composed of multiple light receiving elements that are two-dimensionally arranged. The light receiving element is, for example, a photodiode. The light receiver 131 and the light receiving lens 132 are arranged in the housing 140 so that a plane containing the light receiving surface of the light receiver 131 and a plane containing the principal plane of the light receiving lens 132 will satisfy the Scheimpflug condition relative to the light projection axis of the laser projector 110.

The light receiving lens 132 is provided so as to be close to the light reception window 146 in FIG. 2 and so that the principal plane will be approximately parallel to the inclined surface 142 of the housing 140. These arrangement conditions allow the housing 140 to house the laser projector 110, the LED projector 120, and the imaging unit 130 that satisfy the Scheimpflug condition, in a compact space.

The light receiving lens 132 leads the measurement light or the observation light that is reflected back from the workpiece W and then passes through the light reception window 146, to the light receiver 131 while converging it. The light receiver 131 receives the measurement light or the observation light that is converged by the light receiving lens 132, through the optical filter 133, and the light receiver 131 then outputs a received-light amount distribution.

Figure 6:
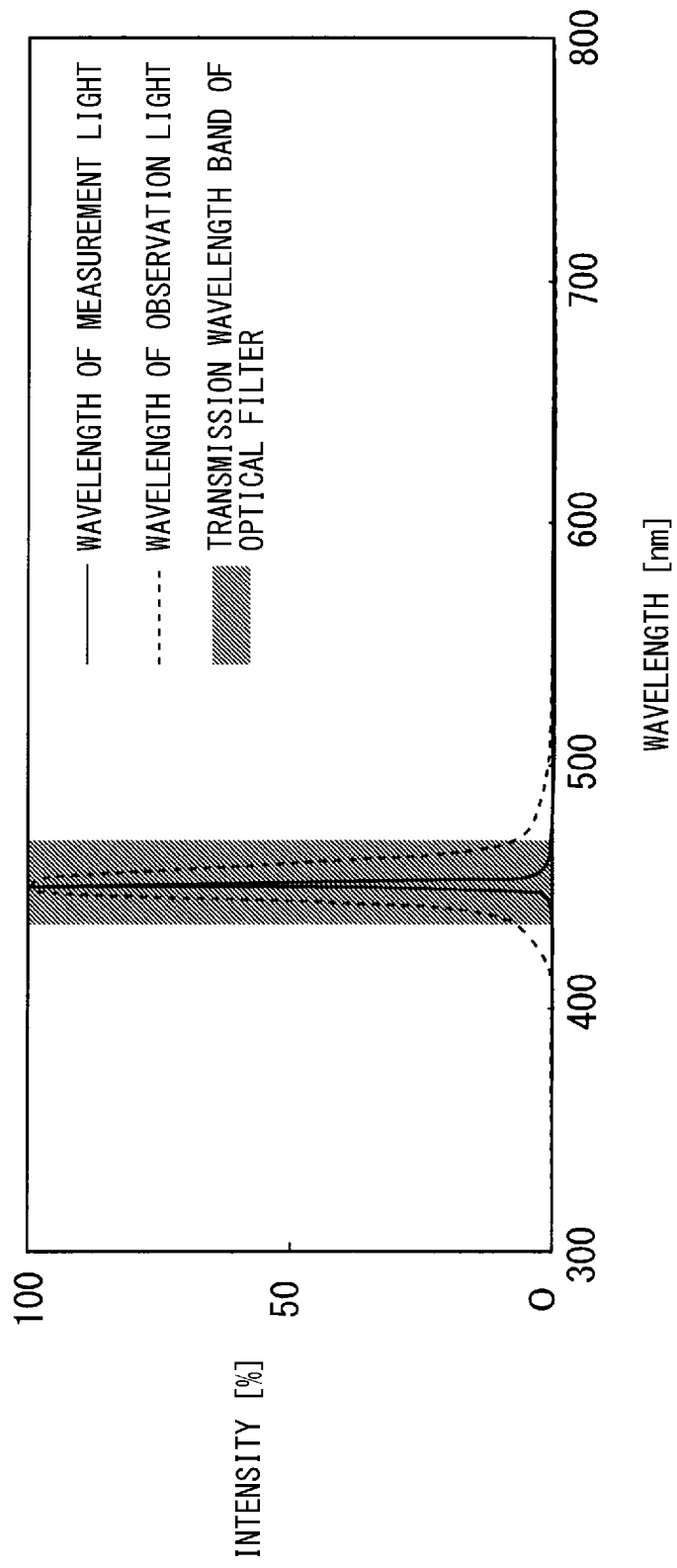
FIG. 6 shows an example of a transmission wavelength band of an optical filter.

The optical filter 133 is, for example, a band-pass filter, and is attached to the light receiving surface of the light receiver 131. FIG. 6 shows an example of a transmission wavelength band of the optical filter 133. In FIG. 6, the horizontal axis represents a wavelength of light, and the vertical axis represents a standardized intensity of the light. A wavelength distribution of the measurement light is shown by a solid line, a wavelength distribution of the observation light is shown by a dashed line, and a transmission wavelength band of the optical filter 133 is shown by a hatching pattern.

In the example in FIG. 6, the wavelength of the measurement light is approximately 450 nm, and the center wavelength of the observation light is approximately equal to the wavelength of the measurement light. The optical filter 133 transmits light having a wavelength of approximately 450 nm and shields light in bands of other wavelengths. In this case, the measurement light and a component of the observation light having a wavelength that is approximately equal to the wavelength of the measurement light pass through the optical filter 133 and reach the light receiver 131. On the other hand, a component of the observation light having a wavelength that is greatly different from the wavelength of the measurement light and ambient light are shielded by the optical filter 133.

In these conditions, profile data and observation image data are accurately generated. Moreover, the measurement light having the wavelength of 400 nm or greater allows a user to easily visually recognize the measurement light. This enhances usability of the optical displacement meter 500. Furthermore, the measurement light having the wavelength of 480 nm or less enables generating the profile data with high accuracy.

Although the center wavelength of the observation light is approximately equal to the wavelength of the measurement light in the example in FIG. 6, the embodiment of the present invention is not limited to this relationship. The center wavelength of the observation light may not be equal to the wavelength of the measurement light on the condition that the wavelength of the measurement light is included in the range of the wavelength distribution of the observation light. In addition, the transmission wavelength band of the optical filter 133 may be narrower or wider than the range of the example in FIG. 6 on the condition that the transmittance of the optical filter 133 in the wavelength range of the measurement light is higher than the transmittance of the optical filter 133 outside the wavelength range of the measurement light.

(3) Generation of Profile Data

Figure 7:
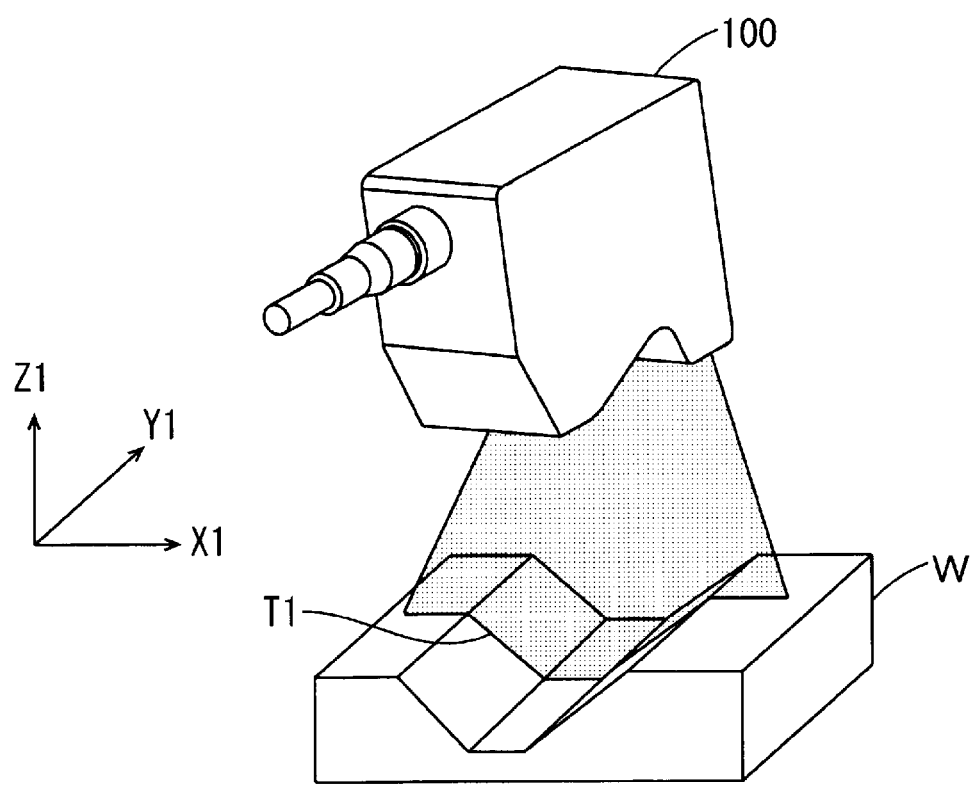
FIG. 7 is a perspective view of exterior appearances of the imaging head and a workpiece.
Figure 8:
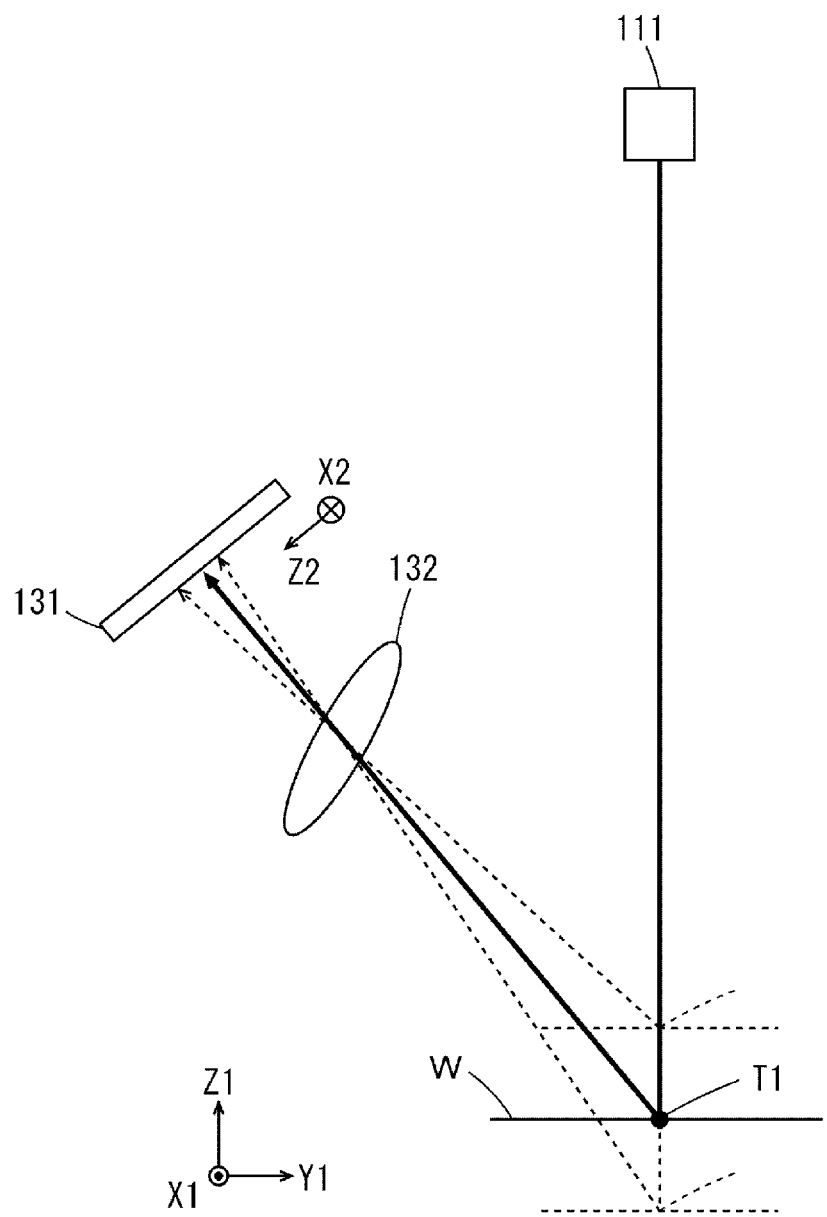
FIG. 8 shows a relationship between an irradiation position of the measurement light on a surface of a workpiece and an incident position of the light at the light receiver.
Figure 9:
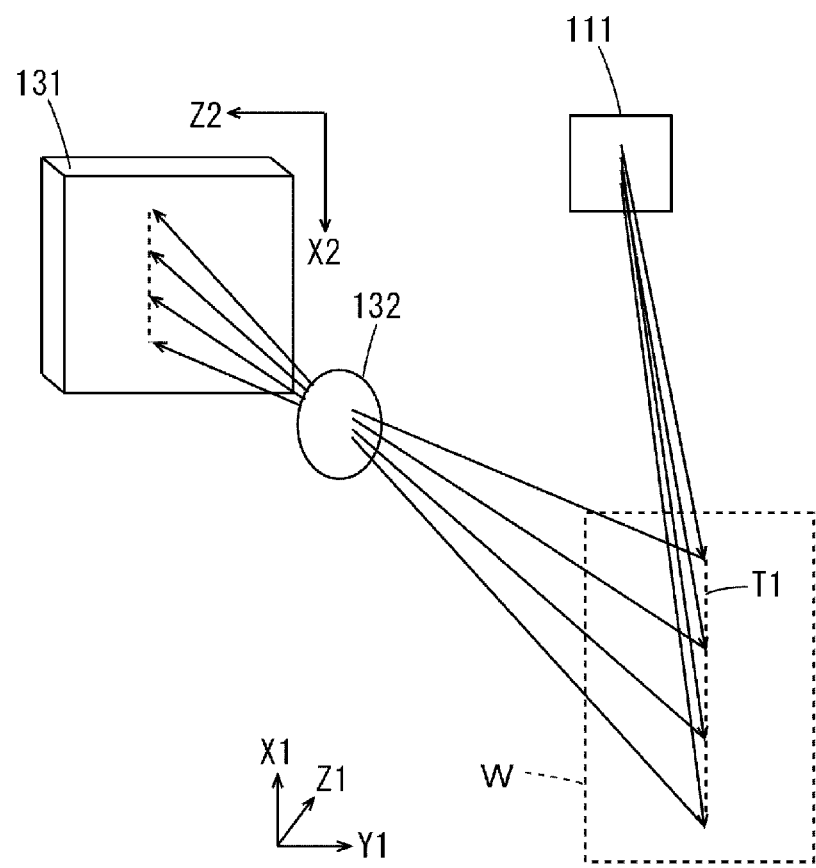
FIG. 9 shows a relationship between an irradiation position of the measurement light on a surface of a workpiece and an incident position of the light at the light receiver.

FIG. 7 is a perspective view of exterior appearances of the imaging head 100 and a workpiece W. FIGS. 8 and 9 respectively show a relationship between an irradiation position of the measurement light on a surface of a workpiece W and an incident position of the light at the light receiver 131. In FIGS. 7 to 9, two directions that are orthogonal to each other in a horizontal plane are defined as an X1 direction and a Y1 direction and are indicated by arrows X1 and Y1, respectively. In addition, the vertical direction is defined as a Z1 direction and is indicated by an arrow Z1. The X1 direction, the Y1 direction, and the Z1 direction respectively correspond to the width direction, the longitudinal direction, and the up-down direction of the housing 140 in FIG. 2. In FIGS. 8 and 9, two directions that are orthogonal to each other on the light receiving surface of the light receiver 131 are defined as an X2 direction and a Z2 direction and are indicated by arrows X2 and Z2, respectively.

In the example in FIG. 7, a groove having a trapezoidal section is formed in the surface of the workpiece W so as to extend in the Y1 direction. The imaging head 100 emits the strip-shaped measurement light along the X1 direction to the surface of the workpiece W. The linear region on the surface of the workpiece W, to which the strip-shaped measurement light is emitted, is called an "irradiated region T1" hereinafter. As shown in FIG. 8, the measurement light that is reflected at the irradiated region T1 enters the light receiver 131 through the light receiving lens 132. In this situation, difference in the reflection position in the Z1 direction of the light at the irradiated region T1 causes change in the incident position in the Z2 direction of the reflected light to the light receiver 131.

Similarly, as shown in FIG. 9, difference in the reflection position in the X1 direction of the light at the irradiated region T1 causes change in the incident position in the X2 direction of the reflected light to the light receiver 131. In view of this, the position in the Z2 direction of the light entering the light receiver 131 represents the position or height in the Z1 direction of the irradiated region T1, and the incident position in the X2 direction of the light at the light receiver 131 represents the position in the X1 direction of the irradiated region T1.

Figure 10:
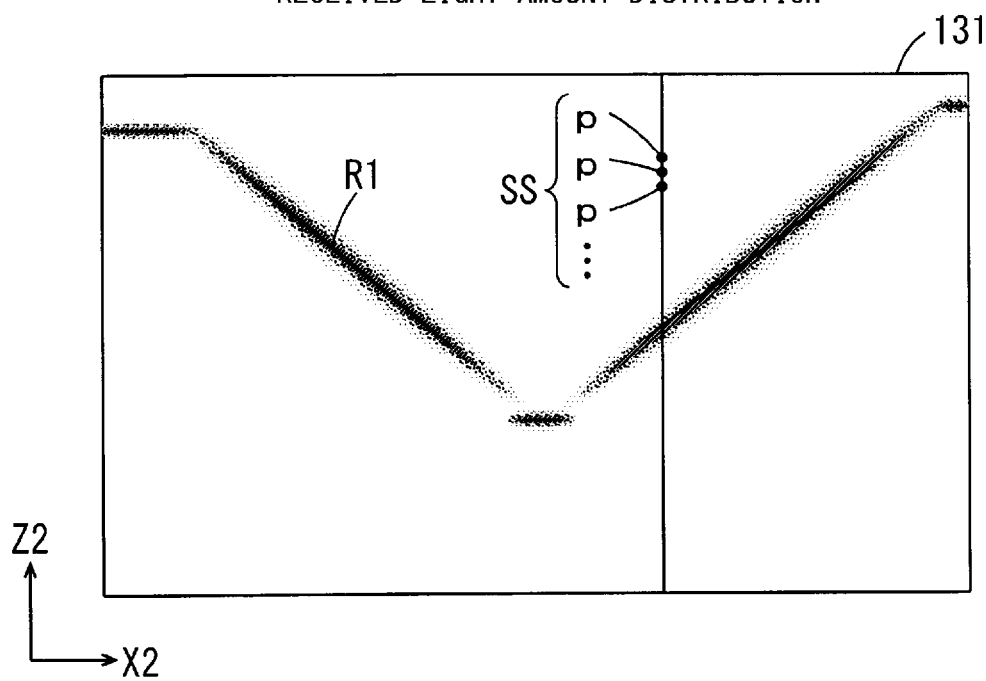
FIG. 10 shows a received-light amount distribution at a light receiving surface of the light receiver.

FIG. 10 shows a received-light amount distribution at the light receiving surface of the light receiver 131. As shown in FIG. 10, multiple pixels "p" of the light receiver 131 are two-dimensionally arranged along the X2 direction and the Z2 direction. Each array of the multiple pixels "p" along the Z2 direction is called a "pixel array SS". The light that is reflected at the irradiated region T1 in FIG. 7 mostly enters a light receiving region R1, as shown in FIG. 10. Thus, the received-light amount of the pixel "p" at the light receiving region R1 is large. On the basis of the received-light amount distribution of the measurement light in FIG. 10, measurement image data is generated by the measurement image generating unit 230 in FIG. 1.

Figure 11:
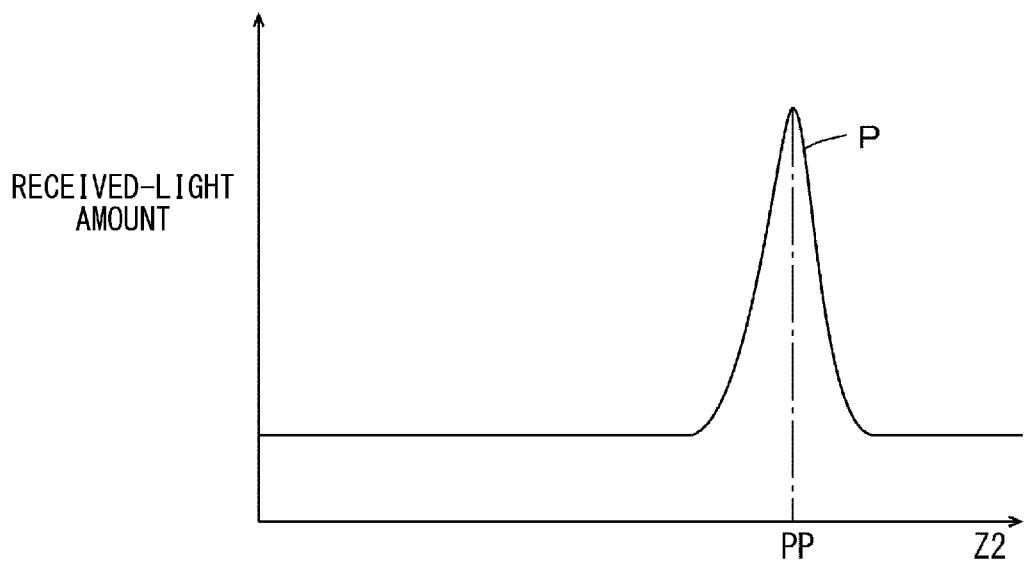
FIG. 11 shows waveform data of one pixel array in FIG. 10.

On the basis of the measurement image data, waveform data of each pixel array SS is generated by the profile generating unit 250 in FIG. 1. FIG. 11 shows waveform data of one pixel array SS in FIG. 10. In FIG. 11, the horizontal axis represents a position in the Z2 direction, and the vertical axis represents a received-light amount. As shown in FIG. 11, the waveform data of one pixel array SS includes a peak "P" at the maximum value, which corresponds to the light receiving region R1 in FIG. 10. The position in the Z2 direction of the peak "P" (hereinafter called a "peak position PP") represents the height of the surface or of the reflection surface at the irradiated region T1 of the workpiece W.

One peak position PP is detected with respect to each waveform data of the corresponding pixel array SS by the profile generating unit 250. Moreover, on the basis of the multiple peak positions PP, profile data showing a profile or a shape of the irradiated region T1 of the workpiece W is generated by the profile generating unit 250.

Figure 12:
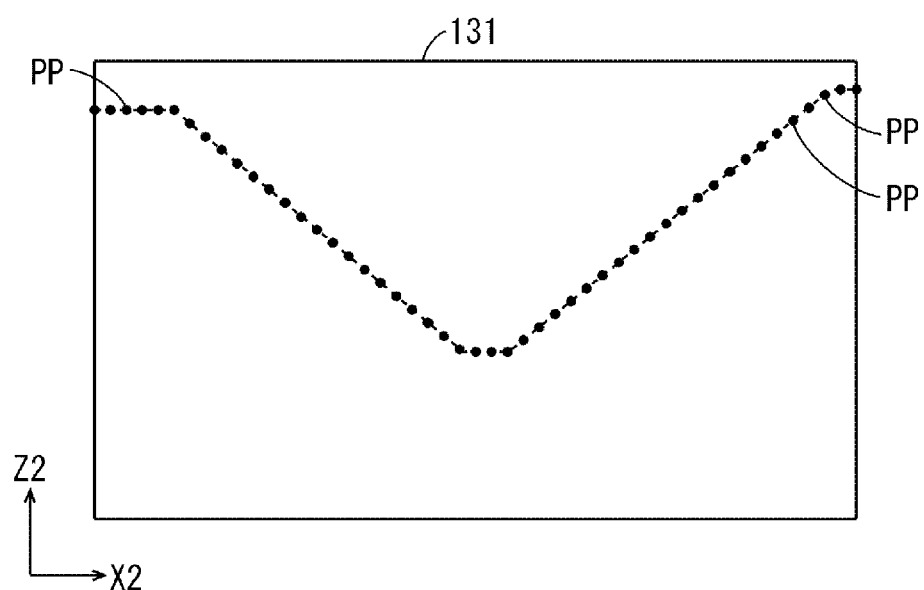
FIG. 12 shows all peak positions in the received-light amount distribution in FIG. 10.
Figure 13:
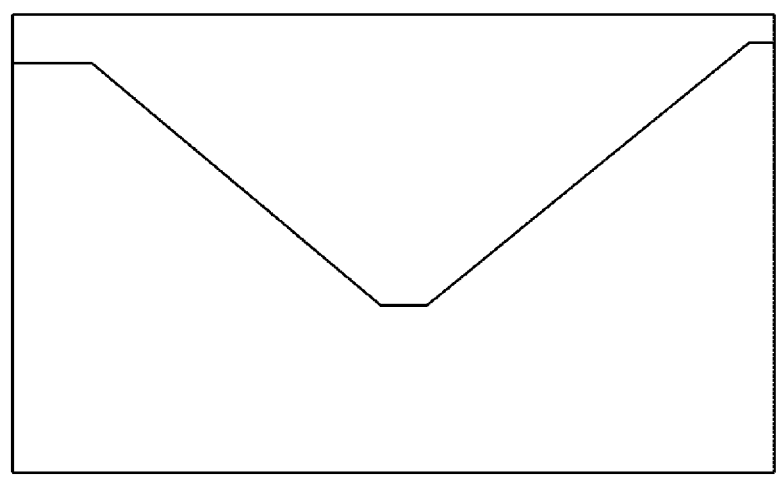
FIG. 13 shows profile data generated on the basis of the peak positions in FIG. 12.

FIG. 12 shows all peak positions PP in the received-light amount distribution in FIG. 10. FIG. 13 shows profile data that is generated on the basis of the peak positions PP in FIG. 12. As shown in FIGS. 12 and 13, all of the detected peak positions PP are shown by a continuous line, to generate profile data showing a profile of the workpiece W.

(4) Setting of Image Obtaining Conditions

As described above, the optical displacement meter 500 allows switching of displays among an observation image, a measurement image, and a composite image and also allows specifying image generating conditions. In this embodiment, the LED projector 120 in FIG. 1 is controlled so as to be lighted at the same time as the laser projector 110 is lighted. That is, the observation light and the measurement light are emitted simultaneously. In the state in which the laser projector 110 and the imaging unit 130 satisfy the Scheimpflug condition, the focal point of the light receiver 131 coincides with every position that is measured by the measurement light on a workpiece W, even when the workpiece W has a part with a height greatly different from the height of other part. Thus, observation image data showing the measurement light irradiated part and the vicinity region thereof on the workpiece W is generated.

Figure 14:
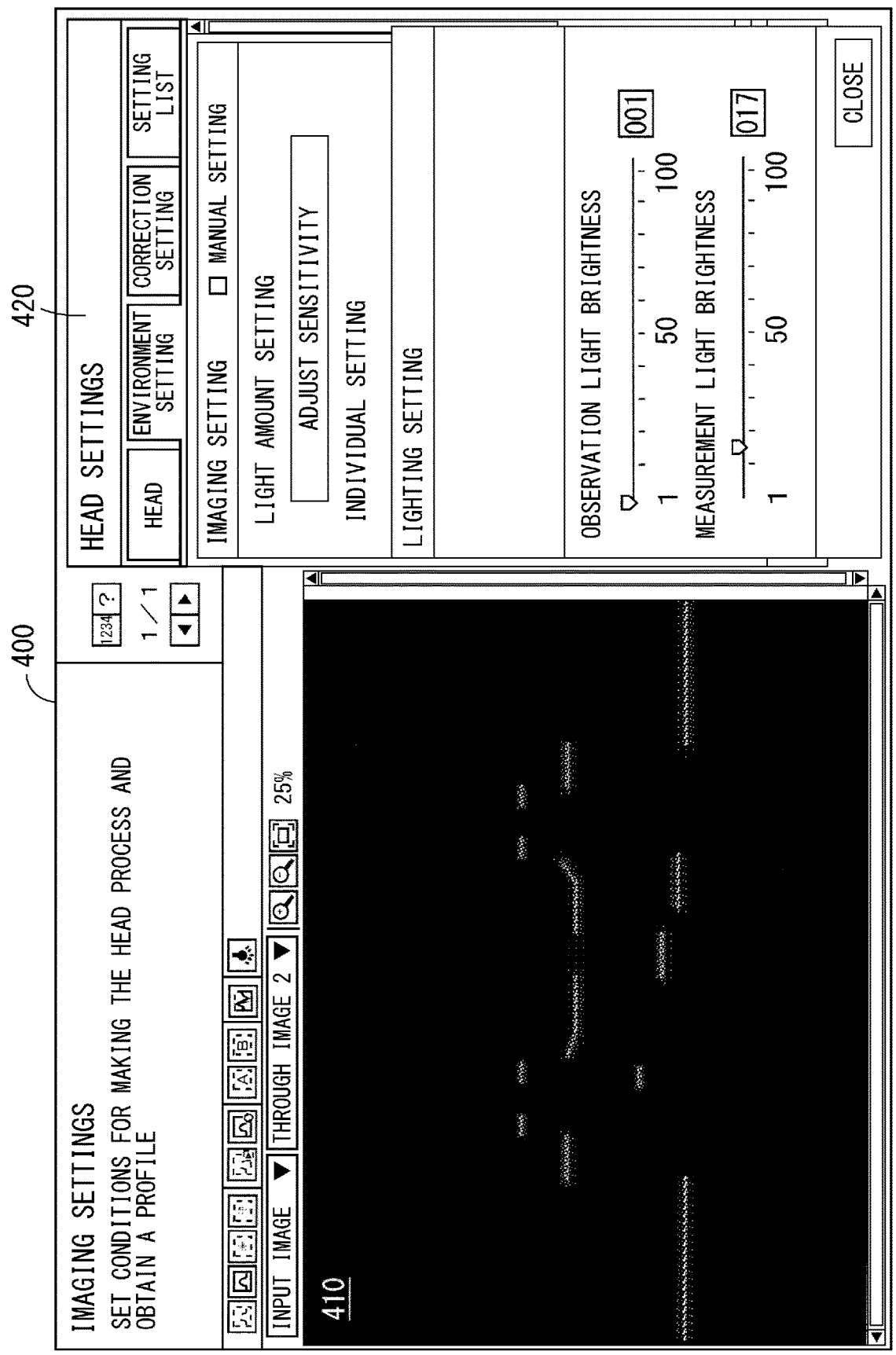
FIG. 14 shows an example of a screen displayed on a display.
Figure 15:
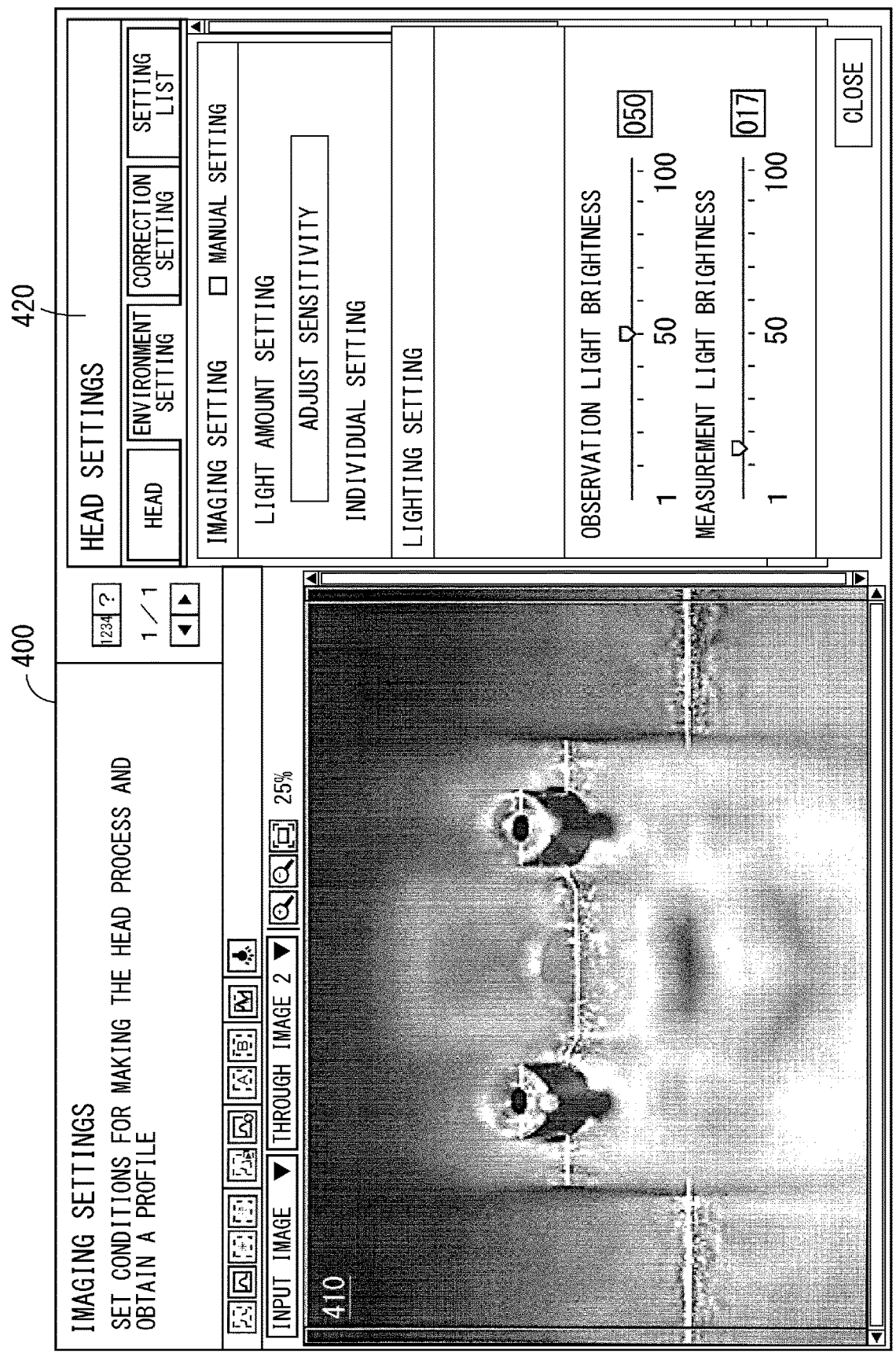
FIG. 15 shows an example of a screen displayed on the display.

An observation image is displayed on the display 400 on the basis of the generated observation image data. FIGS. 14 and 15 show examples of screens displayed on the display 400. As shown in FIG. 14, the screen on the display 400 includes an image display region 410 and a specification receiving region 420 that are provided side by side. Various kinds of images are able to be displayed in the image display region 410. In the examples in FIGS. 14 and 15, an observation image is displayed in the image display region 410.

A graphical user interface (GUI) including an operation button and an operation bar or a numerical value input field is displayed in the specification receiving region 420. A user is allowed to specify the imaging conditions by operating the GUI in the specification receiving region 420 through the input unit 300 in FIG. 1. The setting unit 210 in FIG. 1 sets the imaging conditions in accordance with the specification provided through the specification receiving region 420.

As shown in FIG. 14, measurement light irradiated parts on a workpiece W appear clearly in the form of bright lines in the observation image. However, in the example in FIG. 14, regions in the vicinity of the measurement light irradiated parts on the workpiece W do not clearly appear due to low brightness of the observation light. In such a case, a user can increase the brightness of the observation light by operating the GUI in the specification receiving region 420. This enables displaying an observation image that clearly shows the measurement light irradiated parts and the vicinity regions thereof but does not clearly show other regions on the workpiece W, in the image display region 410, as shown in FIG. 15.

A user is allowed to adjust the positions of the imaging head 100 and the workpiece W so that a desired part on the workpiece W will clearly appear in the observation image, while viewing the observation image displayed in the image display region 410. Thus, the position of the imaging head 100 relative to the workpiece W is easily adjusted. Moreover, a user is allowed to more precisely adjust the position of the imaging head 100 relative to the workpiece W by adjusting the position of the imaging head 100 or the workpiece W so that the bright line will overlap a desired part on the workpiece W in the observation image.

It is important that an observation image clearly shows a measurement light irradiated part on a workpiece W, but the necessary degree of clearness of a displayed region in the vicinity of the irradiated part differs depending on the observation situation. For this reason, in the case in which the LED projector 120 is automatically lighted and the brightness of the observation light is automatically adjusted, the usability of the optical displacement meter 500 is undesirably degraded. Thus, in this embodiment, the LED projector 120 is not automatically lighted but instead is lighted in response to an instruction from a user. Also, the brightness of the observation light is not automatically adjusted but instead is adjusted in response to specification manually input by a user.

Figure 16:
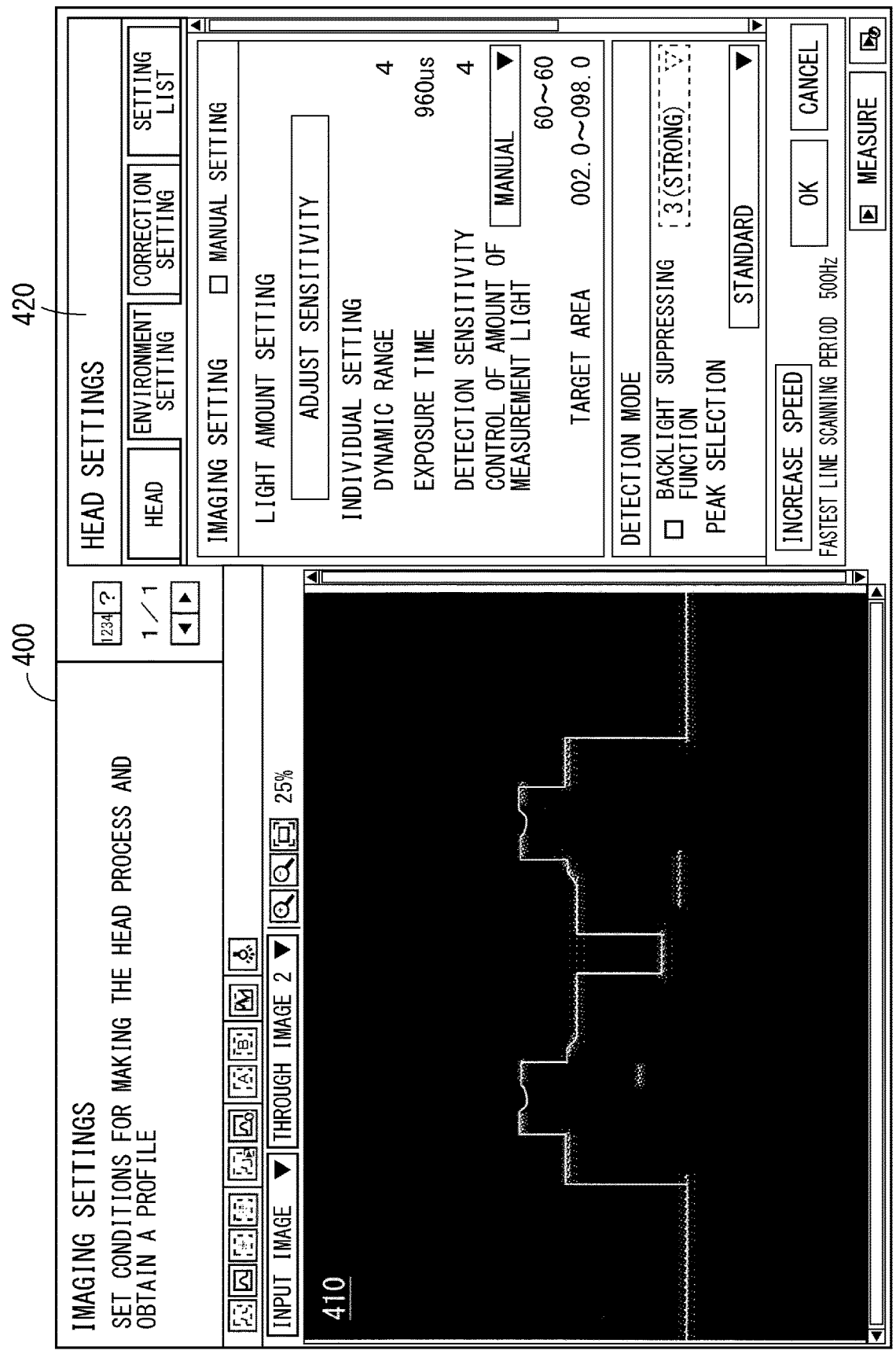
FIG. 16 shows another display example of an image display region.

Other image that facilitates position adjustment of the imaging head 100 relative to the workpiece W is able to be displayed in the image display region 410. FIG. 16 shows another display example of the image display region 410. The display processing unit 270 in FIG. 1 generates first composite image data that shows a first composite image containing a profile superimposed on a measurement image, by compositing measurement image data and profile data. The image display region 410 in FIG. 16 displays the first composite image based on the first composite image data.

In a case in which multiple reflection of the measurement light at a surface of a workpiece W occurs or the measurement light goes to the internal side of the workpiece W, the light reflected back from a position other than the surface of the workpiece W reaches the imaging unit 130. This provides a profile that does not reflect the actual sectional shape of the workpiece W. In such a case, as shown in FIG. 16, bright lines of the measurement light and the profile are displayed in a superimposed manner to allow a user to understand the part causing the incorrect profile.

In response to an instruction from the input unit 300 in FIG. 1, the display processing unit 270 displays an image in the image display region 410 by switching the observation image in FIG. 15 and the first composite image in FIG. 16. The workpiece W may include multiple parts that have mutually similar structures and that are formed so as to be arranged in the Y1 direction or the longitudinal direction of the housing 140, as in the case of an integrated circuit chip, for example. In such a case, also, a user easily recognizes whether the measurement light irradiates a desired part on the workpiece W, by viewing the profile in the first composite image as well as viewing the measurement light irradiated part on the workpiece W in the observation image.

Figure 17:
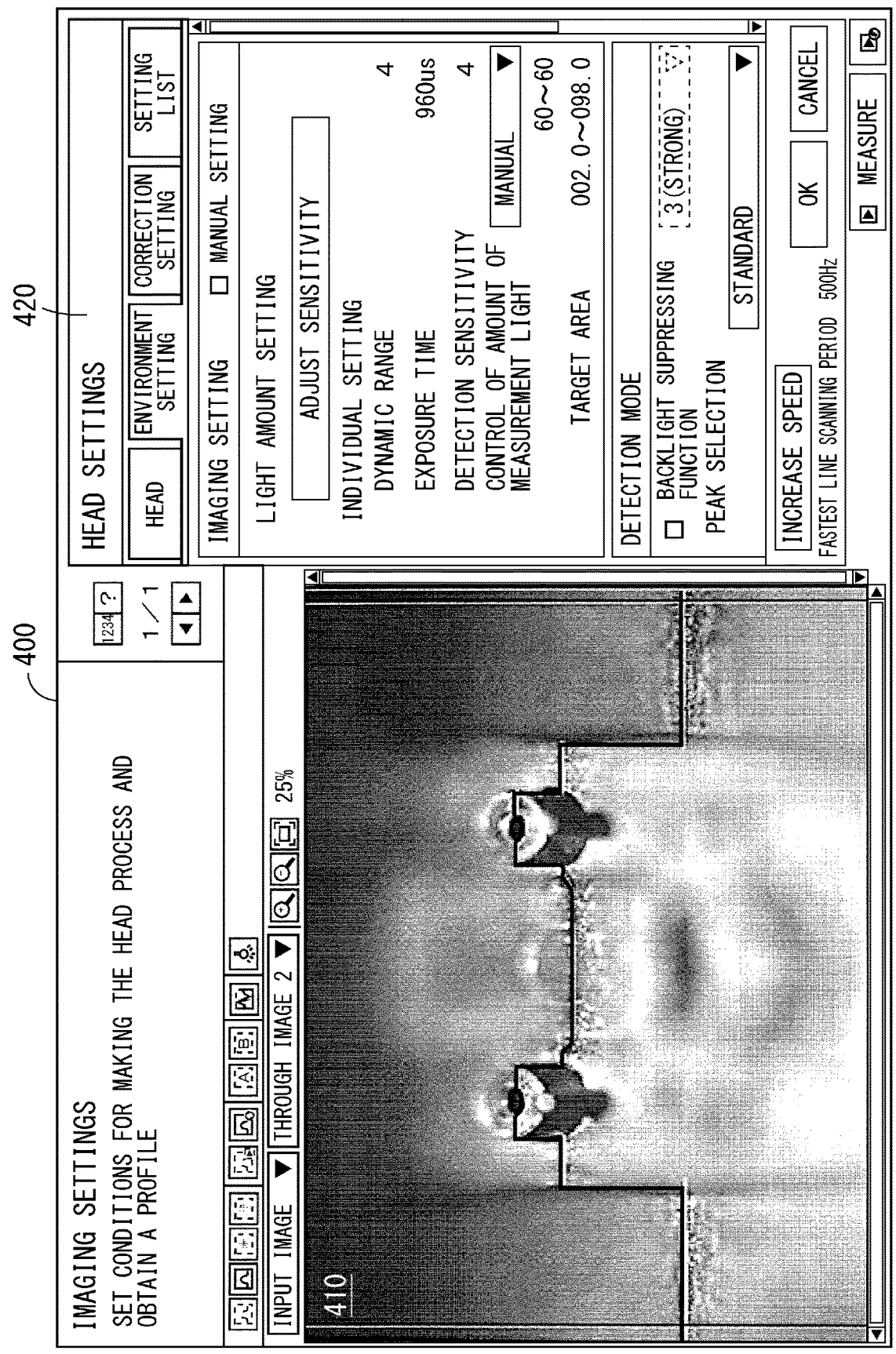
FIG. 17 shows yet another display example of the image display region.

FIG. 17 shows yet another display example of the image display region 410. The display processing unit 270 generates second composite image data that shows a second composite image containing a profile superimposed on an observation image, by compositing observation image data and profile data. In the example in FIG. 17, the second composite image is displayed in the image display region 410. A user easily recognizes whether the measurement light irradiates a desired part on the workpiece W, by viewing the observation image and the profile in the second composite image.

(5) Effects

In the optical displacement meter 500 of this embodiment, the measurement light is emitted to a workpiece W by the laser projector 110, and the measurement light that is reflected back from the workpiece W is converged by the light receiving lens 132. The light receiver 131 receives the measurement light that is converged by the light receiving lens 132 and then outputs a received-light amount distribution. Profile data is generated on the basis of the received-light amount distribution of the measurement light, which is output by the light receiver 131.

On the other hand, the observation light is emitted to the workpiece W by the LED projector 120, and the observation light that is reflected back from the workpiece W is converged by the light receiving lens 132. The light receiver 131 receives the observation light that is converged by the light receiving lens 132 and then outputs a received-light amount distribution. Observation image data is generated on the basis of the received-light amount distribution of the observation light, which is output by the light receiver 131.

In these conditions, the laser projector 110, the light receiver 131, and the light receiving lens 132 are arranged so that the plane containing the light receiving surface of the light receiver 131 and the plane containing the principal plane of the light receiving lens 132 will satisfy the Scheimpflug condition relative to the light projection axis of the laser projector 110. In this case, the focal point of the light receiver 131 coincides with every position that is measured by the measurement light on the workpiece W, even when the workpiece W has a part with a height greatly different from the height of other part. Thus, the profile data is generated with high accuracy.

Moreover, observation image data that shows an observation image in which the focal point of the light receiver 131 coincides with the position measured by the measurement light on the workpiece W is generated. Thus, the observation image clearly shows the measurement position that is measured by the measurement light, on the workpiece W. The observation image data shows a natural observation image of the workpiece W that is observed when a user views the workpiece W from above.

This facilitates a user to adjust the position of the imaging head 100 relative to the workpiece W by adjusting the position of the imaging head 100 or the workpiece W so that a desired part on the workpiece W will clearly appear in the observation image. As a result, the position adjustment of the optical displacement meter 500 relative to the workpiece W is easily performed without reducing measurement accuracy of the profile.

<2> Second Embodiment

The optical displacement meter 500 according to a second embodiment differs from the optical displacement meter 500 according to the first embodiment in the following ways. The optical displacement meter 500 of this embodiment has a configuration similar to that of the optical displacement meter 500 in FIG. 1 of the first embodiment. In this embodiment, the laser projector 110 and the LED projector 120 are controlled so as to be lighted alternately, by the head controlling unit 220. The measurement image data and the observation image data are alternately generated by the measurement image generating unit 230 and the observation image generating unit 240, respectively.

Figure 18:
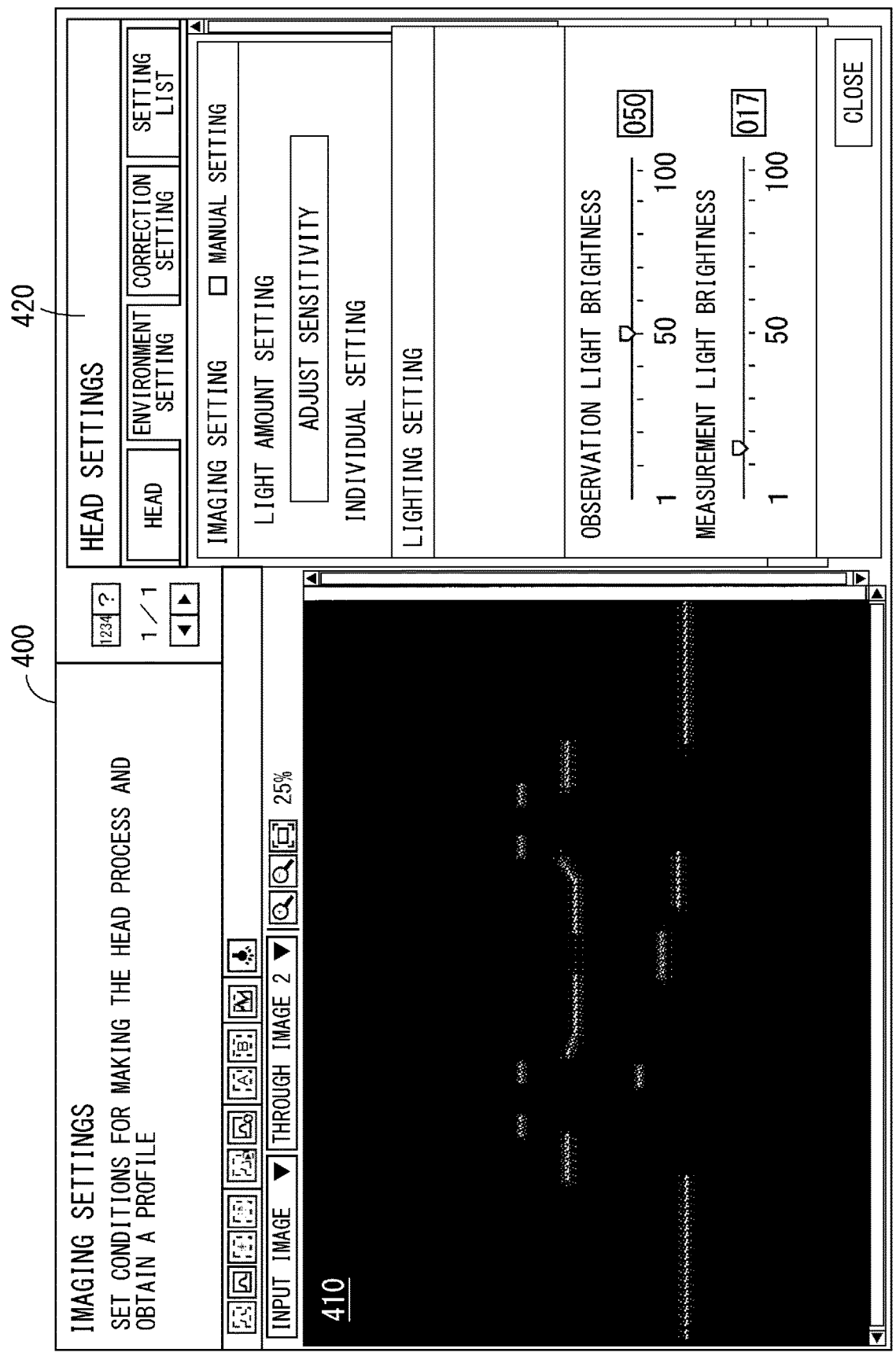
FIG. 18 shows a measurement image based on measurement image data that is generated by a measurement image generating unit.
Figure 19:
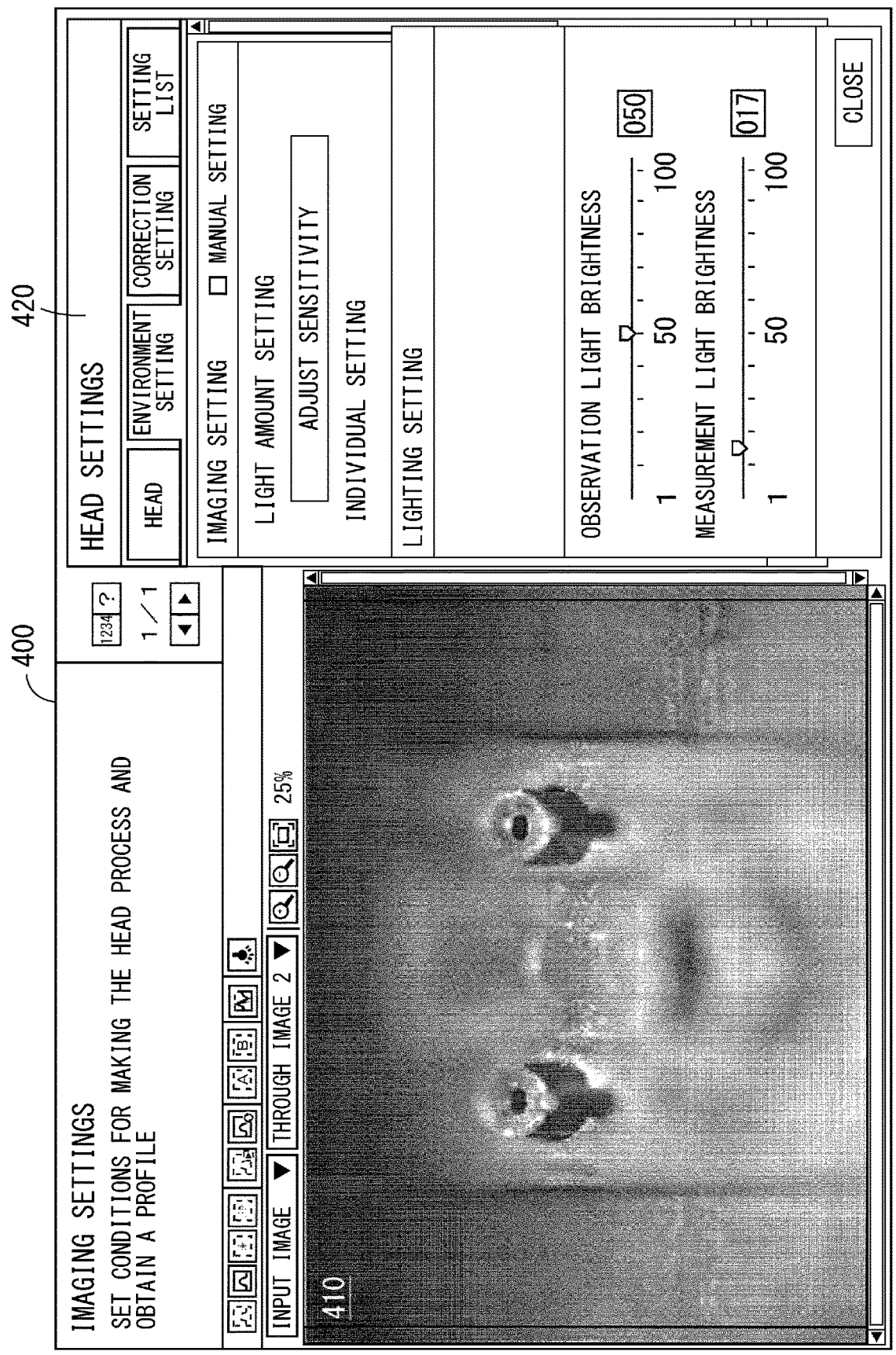
FIG. 19 shows an observation image based on observation image data that is generated by an observation image generating unit.

FIG. 18 shows a measurement image based on measurement image data generated by the measurement image generating unit 230. FIG. 19 shows an observation image based on observation image data generated by the observation image generating unit 240. As shown in FIG. 18, measurement light irradiated parts on a workpiece W appear in the form of bright lines in the measurement image. On the other hand, as shown in FIG. 19, bright lines representing the measurement light irradiated parts on the workpiece W do not appear in the observation image of this embodiment.

The display processing unit 270 displays the measurement image in FIG. 18 and the observation image in FIG. 19 repeatedly and alternately on the display 400. A user is allowed to adjust the position of the imaging head 100 or the workpiece W so that the bright line in the measurement image will overlap a desired part on the workpiece W in the observation image, while viewing the measurement image and the observation image that are alternately displayed. Thus, the position of the imaging head 100 relative to the workpiece W is easily and precisely adjusted.

The display processing unit 270 may display the image by switching between the measurement image and the observation image at a frequency of 10 times or greater per 1 second, for example. In this case, a user can scarcely perceive the alternation of the measurement image and the observation image. Alternatively, a user perceives that an image similar to an image that is obtained when the laser projector 110 and the LED projector 120 are lighted simultaneously, that is, the observation image as shown in FIG. 15, is displayed on the display 400. The user more efficiently adjusts the position of the imaging head 100 relative to the workpiece W by perceiving such an image.

In another case, the display processing unit 270 may generate image data that shows an image similar to an image obtained when the laser projector 110 and the LED projector 120 are lighted simultaneously, by compositing the measurement image data and the observation image data and may display the resultant image on the display 400. In this case, also, a user more efficiently adjusts the position of the imaging head 100 relative to the workpiece W by viewing the image displayed on the display 400.

<3> Third Embodiment

The optical displacement meter 500 according to a third embodiment differs from the optical displacement meter 500 according to the first embodiment in the following ways. The optical displacement meter 500 of the third embodiment has a configuration similar to that of the optical displacement meter 500 in FIG. 1 of the first embodiment. In this embodiment, the laser projector 110 and the LED projector 120 are controlled so as to be lighted alternately during an exposure period of the imaging unit 130, by the head controlling unit 220. The observation image data is generated by the observation image generating unit 240.

Specifically, the head controlling unit 220 generates a binary control pulse for controlling each of the laser projector 110, the LED projector 120, and the imaging unit 130 of the imaging head 100. The control pulse for controlling the imaging unit 130 is called an "imaging pulse". The control pulse for controlling the laser projector 110 is called a "measurement pulse". The control pulse for controlling the LED projector 120 is called an "observation pulse".

The imaging unit 130 becomes an exposed state in response to an imaging pulse at an "H" level and becomes an unexposed state in response to an imaging pulse at an "L" level. The laser projector 110 becomes a lighted state in response to a measurement pulse at an "H" level and becomes an unlighted state in response to a measurement pulse at an "L" level. The LED projector 120 becomes a lighted state in response to an observation pulse at an "H" level and becomes an unlighted state in response to an observation pulse at an "L" level.

Figure 20:
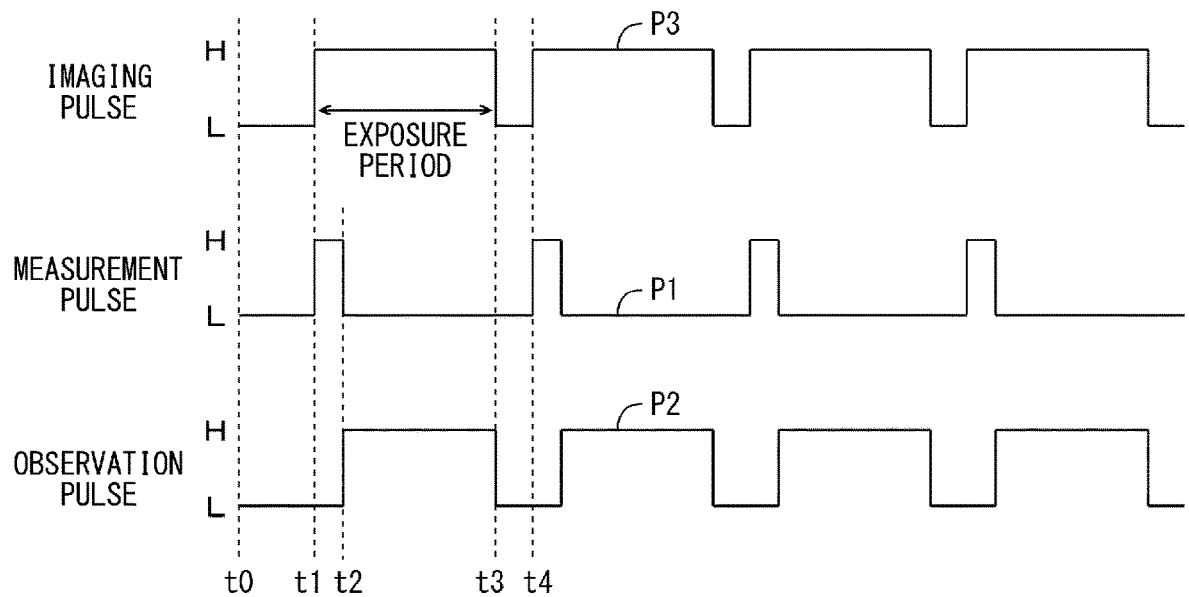
FIG. 20 is a timing chart of control pulses to be applied to the imaging head.

FIG. 20 is a timing chart of control pulses to be applied to the imaging head 100. As shown in FIG. 20, each of a measurement pulse P1, an observation pulse P2, and an imaging pulse P3 is at the "L" level at the initial time point t0. Thus, the laser projector 110 is in the unlighted state, the LED projector 120 is in the unlighted state, and the imaging unit 130 is in the unexposed state.

The imaging pulse P3 rises to the "H" level, and the measurement pulse P1 rises to the "H" level, at the time point t1. At this time, the imaging unit 130 becomes the exposed state. The laser projector 110 becomes the lighted state, and the measurement light is emitted to a workpiece W. The measurement pulse P1 falls to the "L" level, and the observation pulse P2 rises to the "H" level, at the time point t2. At this time, the laser projector 110 becomes the unlighted state. The LED projector 120 becomes the lighted state, and the observation light is emitted to the workpiece W.

The imaging pulse P3 falls to the "L" level, and the observation pulse P2 falls to the "L" level, at the time point t3. At this time, the imaging unit 130 becomes the unexposed state. The LED projector 120 becomes the unlighted state. These states are maintained until the time point t4. Thereafter, the operation from the time point t1 to the time point t4 is repeated.

The period between the time points t1 and t3 is an exposed period. The imaging unit 130 receives light, which is reflected back from the workpiece W, during the exposure period, and the imaging unit 130 outputs a received-light amount distribution of the reflected light during a period between the time points t3 and t4. On the basis of the received-light amount distribution output by the imaging unit 130, observation image data is generated by the observation image generating unit 240. The display processing unit 270 displays an observation image on the display 400 on the basis of the observation image data, which is generated by the observation image generating unit 240.

The observation image data of this embodiment shows an observation image similar to an image that is obtained when the laser projector 110 and the LED projector 120 are lighted simultaneously, that is, the observation image as shown in FIG. 15. This allows a user to adjust the position of the imaging head 100 or the workpiece W so that a bright line will overlap a desired part on the workpiece W in the observation image, while viewing the observation image displayed on the display 400. Thus, the position of the imaging head 100 relative to the workpiece W is easily and precisely adjusted.

In this embodiment, the laser projector 110 and the LED projector 120 are controlled so as to be not lighted simultaneously. However, due to malfunction of the head controlling unit 220 or other causes, the laser projector 110 and the LED projector 120 may be lighted simultaneously.

In some cases, it may be desired to limit the intensity of light that is emitted from the imaging head 100, so as to not exceed a predetermined upper limit. In the case in which there is such a limitation, it is necessary to decrease the intensity of the measurement light to be lower than an upper limit in order to avoid excess of the total of the intensities of the measurement light and the observation light over the upper limit. Thus, the exposure time of the imaging unit 130 should be increased, which causes decrease in the processing efficiency.

On the other hand, in the condition that simultaneously lighting the laser projector 110 and the LED projector 120 is inhibited, the intensity of the measurement light can be maintained to the upper limit. This does not require elongation of the exposure time of the imaging unit 130, whereby decrease in the processing efficiency is prevented. In view of this, an exclusive control circuit for inhibiting the laser projector 110 and the LED projector 120 from lighting simultaneously may be further provided.

Figure 21:
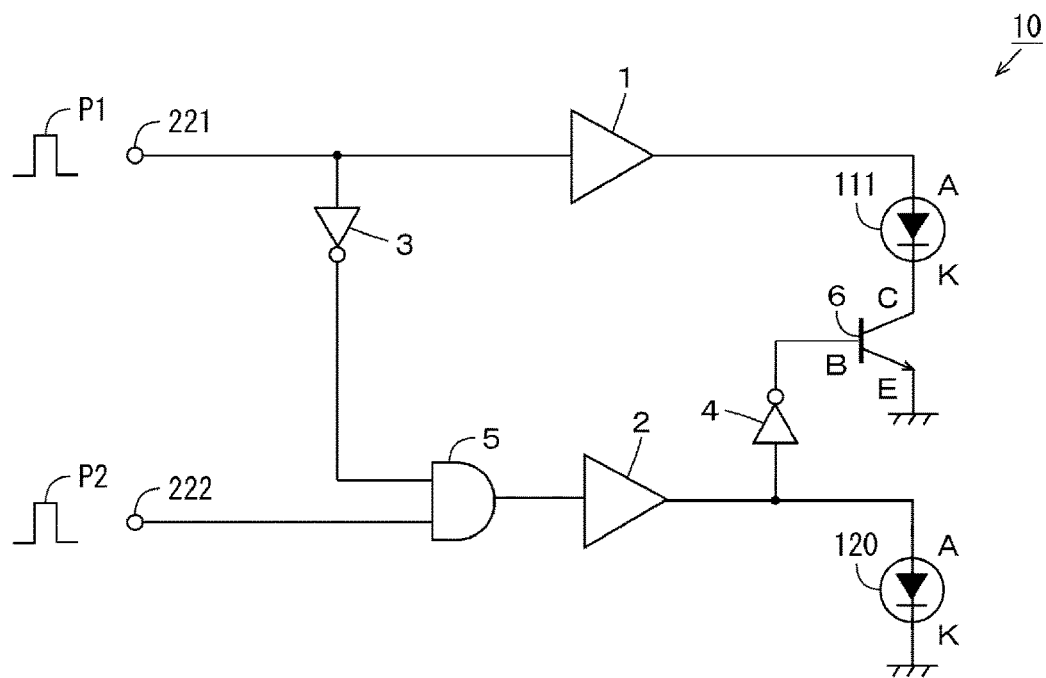
FIG. 21 shows an example of an exclusive control circuit.

FIG. 21 shows an example of the exclusive control circuit. As shown in FIG. 21, the exclusive control circuit 10 includes amplifier circuits 1 and 2, NOT circuits 3 and 4, an AND circuit 5, and an npn bipolar transistor 6 (hereinafter simply called a "transistor 6"). An input part of the amplifier circuit 1 and an input part of the NOT circuit 3 are coupled to a terminal 221 for outputting the measurement pulse P1 of the head controlling unit 220. One of input parts of the AND circuit 5 is coupled to a terminal 222 for outputting the observation pulse P2 of the head controlling unit 220. An output part of the NOT circuit 3 and the other input part of the AND circuit 5 are coupled to each other. An output part of the AND circuit 5 and an input part of the amplifier circuit 2 are coupled to each other.

An anode of the LD111 of the laser projector 110 is coupled to an output part of the amplifier circuit 1. A cathode of the LD111 is coupled to a collector of the transistor 6. An emitter of the transistor 6 is grounded. An anode of an LED of the LED projector 120 and an input part of the NOT circuit 4 are coupled to an output part of the amplifier circuit 2. A cathode of the LED is grounded. An output part of the NOT circuit 4 is coupled to a base of the transistor 6.

This exclusive control circuit 10 applies the control pulse at the "L" level to the LED projector 120 when the measurement pulse P1 is at the "H" level and the observation pulse P2 is either at the "H" level or the "L" level. Thus, the LED projector 120 is not in the lighted state when the measurement pulse P1 and the observation pulse P2 are at the "H" level simultaneously. This inhibits the laser projector 110 and the LED projector 120 from lighting simultaneously. Such an exclusive control circuit may also be provided to the optical displacement meter 500 of the second embodiment.

Figure 22:
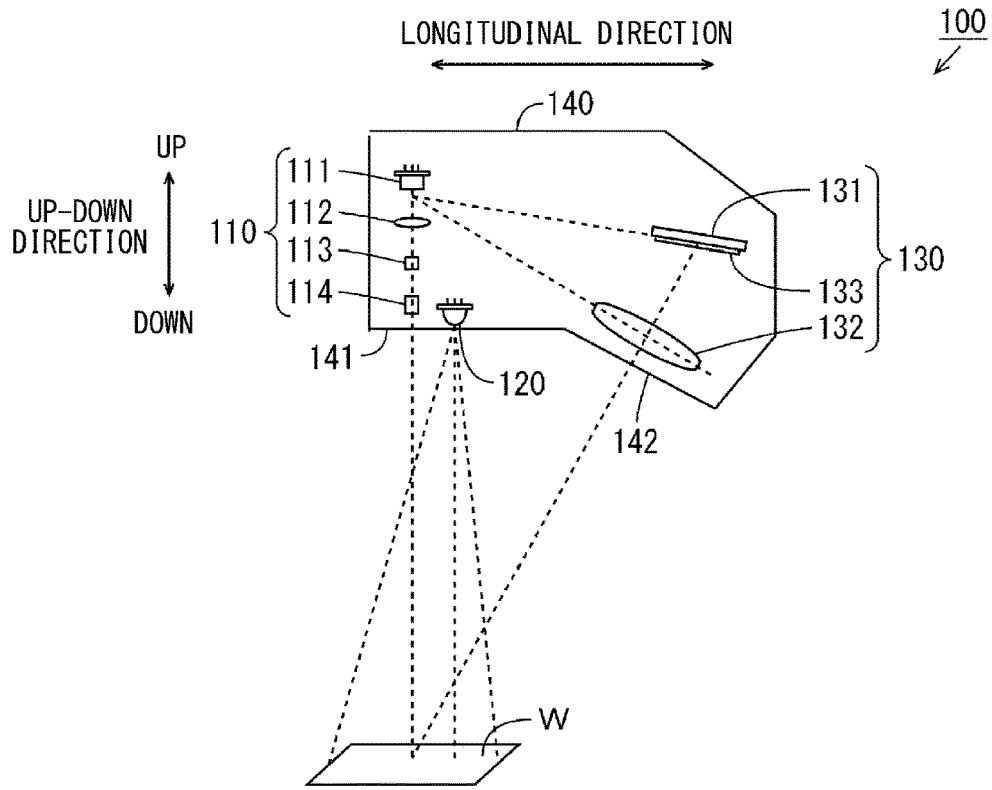
FIG. 22 shows another example of a housing.

<4> Other Embodiments (1) Although the housing 140 is formed with the recess 143 in the foregoing embodiments, the embodiment of the present invention is not limited to this structure. FIG. 22 shows another example of the housing 140. As shown in FIG. 22, the light receiving lens 132 may be positioned lower than the lower surface 141 of the housing 140 depending on a measurement distance between the imaging head 100 and a workpiece W. In such a case, the housing 140 may not be formed with the recess 143.

Figure 23:
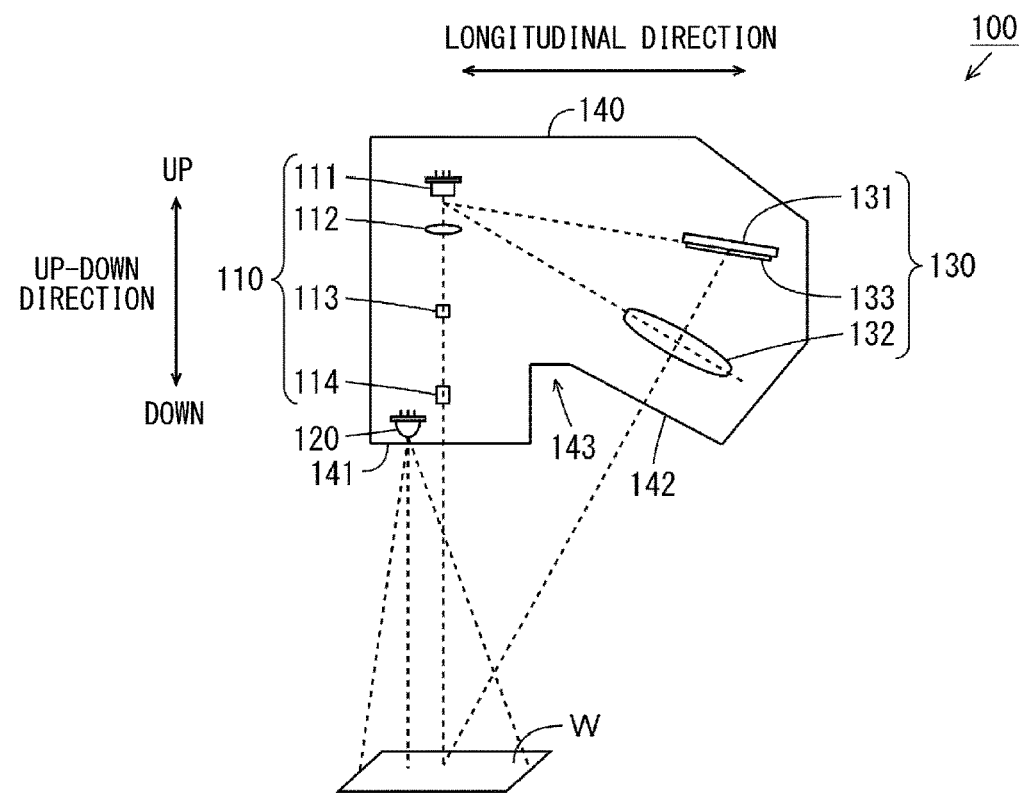
FIG. 23 shows yet another example of the housing.

(2) Although the LED projector 120 is positioned closer to the imaging unit 130 than the laser projector 110 in the longitudinal direction in the foregoing embodiments, the embodiment of the present invention is not limited to this structure. FIG. 23 shows yet another example of the housing 140. As shown in FIG. 23, in a case in which slight enlargement in the longitudinal direction of the housing 140 is allowed, the LED projector 120 may be positioned farther from the imaging unit 130 than the laser projector 110 in the longitudinal direction. In response to this, the observation window 145 is positioned farther from the light reception window 146 than the measurement window 144 in the longitudinal direction.

(3) Although the measurement window 144 and the observation window 145 are separately provided to the lower surface 141 of the housing 140 in the foregoing embodiments, the embodiment of the present invention is not limited to this structure. Instead of the measurement window 144 and the observation window 145, a window that is to be shared for transmitting the measurement light and transmitting the observation light may be provided to the lower surface 141 of the housing 140.

(4) Although the bright lines of the measurement light are displayed in the observation image in the superimposed manner in the foregoing embodiments, the embodiment of the present invention is not limited to this displaying manner. A bright line of the measurement light may not be displayed in an observation image in the superimposed manner. In this case, also, a user easily adjusts the position of the imaging head 100 relative to a workpiece W by adjusting the position of the imaging head 100 or the workpiece W so that a desired part on the workpiece W will clearly appear in the observation image, while viewing the observation image.

(5) Although the measurement light has a wavelength of 400 nm or greater and 480 nm or less in the foregoing embodiments, the embodiment of the present invention is not limited to this wavelength range. In a case of not requiring visual checking of a measurement light irradiated part, the measurement light may have a wavelength of shorter than 400 nm. In another case, the measurement light may have a wavelength of longer than 480 nm on the condition that it does not greatly decrease measurement accuracy of a profile.

The wavelength of the observation light and the transmission wavelength band of the optical filter 133 may be changed in accordance with the wavelength of the measurement light. In a case in which ambient light scarcely enters the light receiver 131, the optical filter 133 may not be attached to the light receiving surface of the light receiver 131.

<5> Correspondence Relationship Between Each Element in the Claims and Each Component in the Embodiments The foregoing embodiments include components that are examples of elements of the claims. That is, the workpiece W corresponds to a measurement object, the optical displacement meter 500 corresponds to an optical displacement meter, the laser projector 110 corresponds to a laser projector, and the LED projector 120 corresponds to an LED projector. The light receiving lens 132 corresponds to a light receiving lens, the light receiver 131 corresponds to a light receiver, the processor 200 corresponds to a processor, the exclusive control circuit 10 corresponds to an exclusive control circuit, and the housing 140 corresponds to a housing. The lower surface 141 and the inclined surface 142 respectively correspond to a first surface and a second surface, and the recess 143 corresponds to a recess. The measurement window 144 corresponds to a measurement window, the observation window 145 corresponds to an observation window, the light reception window 146 corresponds to a light reception window, and the optical filter 133 corresponds to a band-pass filter.

What is claimed is:

1. An optical displacement meter using an optical cutting method for measuring a profile of a measurement object, the optical displacement meter comprising:
    a laser projector having a first light projection axis and configured to emit strip-shaped laser light extending in one direction or emit spot-shaped laser light for scanning in the one direction, to the measurement object, as measurement light;
    an LED projector configured to emit uniform light to the measurement object, as observation light;

a light receiving lens configured to converge reflected light of the measurement light and reflected light of the observation light that are reflected back from the measurement object;

a light receiver having a light receiving surface and configured to receive the light that is converged by the light receiving lens and to output a received-light amount distribution, the light receiving surface being composed of multiple light receiving elements that are two-dimensionally arranged; and a processor configured to execute a process of generating profile data on the basis of the received-light amount distribution of the measurement light output by the light receiver and to execute a process of generating observation image data on the basis of the received-light amount distribution of the observation light output by the light receiver, during measurement, the profile data showing a profile of the measurement object, the observation image data showing an image of the measurement object that is irradiated by the observation light, as an observation image, wherein the laser projector, the light receiver, and the light receiving lens are arranged so that a plane containing the light receiving surface and a plane containing a principal plane of the light receiving lens satisfy the Scheimpflug condition relative to the first light projection axis, whereby observation image data showing an observation image in which a focal point of the light receiver relatively coincides with a region in the vicinity of a measurement position that is irradiated by the measurement light during the measurement, is generated, and wherein the processor is configured to control the laser projector and the LED projector so that the measurement light and the observation light are emitted simultaneously or alternately, and generate the observation image data that shows an observation image superimposed with a bright line of the measurement light on the measurement position where the measurement light was irradiated on the measurement object.

2. The optical displacement meter according to claim 1, wherein the processor is configured to control the laser projector, generate measurement image data that shows an image of the measurement object irradiated by the measurement light as a measurement image on the basis of the received-light amount distribution of the measurement light output by the light receiver, receive settings of brightness of the observation light emitted by the LED projector while displaying the observation image on the display, and receive settings of brightness of the measurement light emitted by the laser projector while displaying the observation image on the display.

3. The optical displacement meter according to claim 2, wherein the processor is configured to control the laser projector and the LED projector so that the measurement light and the observation light are emitted alternately and display the image by automatically switching between the measurement image and the observation image.

4. The optical displacement meter according to claim 1, wherein the LED projector has a second light projection axis parallel to the first light projection axis of the laser projector, in a housing having an internal space for containing the laser projector, the LED projector, the light receiving lens, and the light receiver, the housing comprising:

a first surface perpendicular to the first light projection axis and the second light projection axis;

a second surface provided in a recess that is recessed toward the internal space from the first surface so as to be inclined relative to the first surface;

a measurement window provided to the first surface and configured to transmit the measurement light emitted from the laser projector to the measurement object;

an observation window provided to the first surface and configured to transmit the observation light emitted from the LED projector to the measurement object; and a light reception window provided to the second surface and configured to transmit reflected light of the measurement light and reflected light of the observation light that are reflected back from the measurement object.

5. The optical displacement meter according to claim 4, wherein the observation window is provided at a position closer to the light reception window than the measurement window.

6. The optical displacement meter according to claim 1, further comprising a band-pass filter that is provided on an optical path of light that is reflected back from the measurement object, wherein the laser projector is configured to emit measurement light having a wavelength of 400 nm or greater and 480 nm or less, the LED projector is configured to emit observation light having a wavelength in a range including the wavelength of the measurement light, and a transmittance of the band-pass filter in the wavelength range of the measurement light is higher than a transmittance of the band-pass filter outside the wavelength range of the measurement light.

7. An optical displacement meter using an optical cutting method for measuring a profile of a measurement object, the optical displacement meter comprising:

a laser projector having a first light projection axis and configured to emit strip-shaped laser light extending in one direction or emit spot-shaped laser light for scanning in the one direction, to the measurement object, as measurement light;

an LED projector configured to emit uniform light to the measurement object, as observation light;

a light receiving lens configured to converge reflected light of the measurement light and reflected light of the observation light that are reflected back from the measurement object;

a light receiver having a light receiving surface and configured to receive the light that is converged by the light receiving lens and to output a received-light amount distribution, the light receiving surface being composed of multiple light receiving elements that are two-dimensionally arranged; and a processor configured to execute a process of generating profile data on the basis of the received-light amount distribution of the measurement light output by the light receiver and to execute a process of generating observation image data on the basis of the received-light amount distribution of the observation light output by the light receiver, during measurement, the profile data showing a profile of the measurement object, the observation image data showing an image of the measurement object that is irradiated by the observation light, as an observation image, wherein the laser projector, the light receiver, and the light receiving lens are arranged so that a plane containing the light receiving surface and a plane containing a principal plane of the light receiving lens satisfy the Scheimpflug condition relative to the first light projection axis, whereby observation image data showing an observation image in which a focal point of the light receiver relatively coincides with a region in the vicinity of a measurement position that is irradiated by the measurement light during the measurement, is generated, and wherein the processor is configured to control the laser projector and the LED projector so that the measurement light and the observation light are emitted alternately during an exposure period of the light receiver, and the processor is also configured to generate observation image data that shows an observation image superimposed with a bright line of the measurement light on the measurement position where the measurement light was irradiated on the measurement object.

8. The optical displacement meter according to claim 7, further comprising an exclusive control circuit configured to inhibit the measurement light and the observation light from being emitted simultaneously.

9. An optical displacement meter using an optical cutting method for measuring a profile of a measurement object, the optical displacement meter comprising:
- a laser projector having a first light projection axis and configured to emit strip-shaped laser light extending in one direction or emit spot-shaped laser light for scanning in the one direction, to the measurement object, as measurement light;
- an LED projector configured to emit uniform light to the measurement object, as observation light;
- a light receiving lens configured to converge reflected light of the measurement light and reflected light of the observation light that are reflected back from the measurement object;
- a light receiver having a light receiving surface and configured to receive the light that is converged by the light receiving lens and to output a received-light amount distribution, the light receiving surface being composed of multiple light receiving elements that are two-dimensionally arranged; and
- a processor configured to execute a process of generating profile data on the basis of the received-light amount distribution of the measurement light output by the light receiver and to execute a process of generating observation image data on the basis of the received-light amount distribution of the observation light output by the light receiver, during measurement, the profile data showing a profile of the measurement object, the observation image data showing an image of the measurement object that is irradiated by the observation light, as an observation image, wherein the laser projector, the light receiver, and the light receiving lens are arranged so that a plane containing the light receiving surface and a plane containing a principal plane of the light receiving lens satisfy the Scheimpflug condition relative to the first light projection axis, whereby observation image data showing an observation image in which a focal point of the light receiver relatively coincides with a region in the vicinity of a measurement position that is irradiated by the measurement light during the measurement, is generated, and wherein the processor is configured to control the laser projector and the LED projector so that the measurement light and the observation light are emitted simultaneously or alternately, generate composite image data of a first composite image that shows an observation image superimposed with the profile data on the measurement position where the measurement light was irradiated on the measurement object by compositing the profile data and the observation image data that shows an image of the measurement object that is irradiated by the observation light, generate measurement image data that shows an image of the measurement object that is irradiated by the measurement light as a measurement image on the basis of the received-light amount distribution of the measurement light output by the light receiver, and display the image by switching between the first composite image and the measurement image in response to instruction from a user.

10. The optical displacement meter according to claim 9, wherein the processor is configured to display a second composite image that contains the profile superimposed on the measurement image, by compositing the profile data and the measurement image data.

* * * * *